US010186130B2

(12) United States Patent
Whelan et al.

(10) Patent No.: US 10,186,130 B2
(45) Date of Patent: Jan. 22, 2019

(54) USING HUMAN MOTION SENSORS TO DETECT MOVEMENT WHEN IN THE VICINITY OF HYDRAULIC ROBOTS

(71) Applicant: The Boeing Company, Chicago, IL (US)

(72) Inventors: John Desmond Whelan, Burien, WA (US); Melissa H. Lewis, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/222,008

(22) Filed: Jul. 28, 2016

(65) Prior Publication Data

US 2018/0033276 A1 Feb. 1, 2018

(51) Int. Cl.
| | |
|---|---|
| *G08B 23/00* | (2006.01) |
| *G08B 21/02* | (2006.01) |
| *G06K 9/00* | (2006.01) |
| *B25J 9/16* | (2006.01) |
| *H04W 4/029* | (2018.01) |

(52) U.S. Cl.
CPC ............ *G08B 21/02* (2013.01); *B25J 9/1676* (2013.01); *G06K 9/00348* (2013.01); *G06K 9/00369* (2013.01); *H04W 4/029* (2018.02); *G05B 2219/40202* (2013.01)

(58) Field of Classification Search
CPC . G08B 21/02; G06K 9/00348; G06K 9/00369
USPC ...................................................... 340/573.1
See application file for complete search history.

(56) References Cited

U.S. PATENT DOCUMENTS

| | | |
|---|---|---|
| 4,144,564 A | 3/1979 | Lamb |
| 4,149,262 A | 4/1979 | Lamb et al. |
| 5,014,327 A | 5/1991 | Potter et al. |

(Continued)

FOREIGN PATENT DOCUMENTS

EP 2772336 A2 9/2014

OTHER PUBLICATIONS

Prokopenko et al., "Optimizing Associative Information Transfer Within Content-addressable Memory," International Journal of Unconventional Computation, vol. 3, Issue 3, Special issue: "Towards Theory of Unconventional Computing," 2008, pp. 273-296.

(Continued)

*Primary Examiner* — Tanmay Shah
(74) *Attorney, Agent, or Firm* — Yee & Associates, P.C.

(57) ABSTRACT

The advantageous embodiments include a system for operating machinery in a manufacturing environment. The system includes a sensor system and a computer. The sensor system is configured to distinguish human skeletal positions from non-human object positions and to determine whether one or more humans are present in a predetermined area. The computer is configured to: responsive to determining that only the one or more humans are in the predetermined area, determine whether a false positive result has occurred, wherein the false positive comprises a first determination that the one or more humans are present when no human is actually present. The computer is also configured to: responsive to determining that the false positive result has not occurred, the taking an action selected from the group consisting of issuing an alert, stopping the machinery, or a combination thereof.

29 Claims, 14 Drawing Sheets

(56) References Cited

U.S. PATENT DOCUMENTS

| | | | |
|---|---|---|---|
| 2009/0083207 A1 | 3/2009 | Aparicio, IV | |
| 2011/0050878 A1 | 3/2011 | Wells et al. | |
| 2011/0317871 A1* | 12/2011 | Tossell | G06K 9/00369 |
| | | | 382/103 |
| 2014/0244004 A1* | 8/2014 | Scott | B25J 9/1676 |
| | | | 700/56 |
| 2015/0158178 A1 | 6/2015 | Burmeister et al. | |
| 2015/0228078 A1* | 8/2015 | Zahand | G06T 7/0046 |
| | | | 382/103 |

OTHER PUBLICATIONS

Extended European Search Report, dated Dec. 21, 2017, regarding Application No. 17183576.2, 7 pages.

* cited by examiner

USING HUMAN MOTION SENSORS TO DETECT MOVEMENT WHEN IN THE VICINITY OF HYDRAULIC ROBOTS

BACKGROUND INFORMATION

1. Field

The present disclosure relates to systems which detect the presence of a human around machinery, issue alerts if the human is present, and eliminate false positive results in which the human is determined to be present but is not.

2. Background

Companies which use industrial robots are concerned with safety. Of primary concern is ensuring that humans remain safe near industrial robots. Safety may be accomplished with procedures and rules regarding human behavior, as well as robotic behavior. However, because of the size, complexity, and speed of industrial robots, additional safety systems are desirable.

SUMMARY

The illustrative embodiments provide for a system for operating machinery in a manufacturing environment. The system includes a sensor system configured to distinguish human skeletal positions from non-human object positions. The sensor system is further configured to determine whether one or more humans are present in a restricted area with concerns to the environment. The system also includes a computer. The computer is configured to: responsive to determining that only the one or more humans are in the restricted area, determine whether a false positive result has occurred. The false positive may be a first determination that the one or more humans are present when no human is actually present. The computer is also configured to: responsive to determining that the false positive result has not occurred, take an action selected from the group consisting of issuing an alert, stopping or slowing the machinery, or a combination thereof.

The advantageous embodiments also include a method of operating machinery while operating machinery. The method includes: while operating machinery, determining whether one or more humans are present in a restricted area of the machinery. "Determining" is performed by a sensor system configured to distinguish human skeletal positions from non-human object positions. The method also includes: responsive to determining that only the one or more humans are in the restricted area, determining by a computer whether a false positive result has occurred. The false positive may be a first determination that the one or more humans are present when no human is actually present. The method also includes: responsive to determining that the false positive result has not occurred, taking an action selected from the group consisting of issuing an alert, stopping or slowing the machinery, or a combination thereof.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
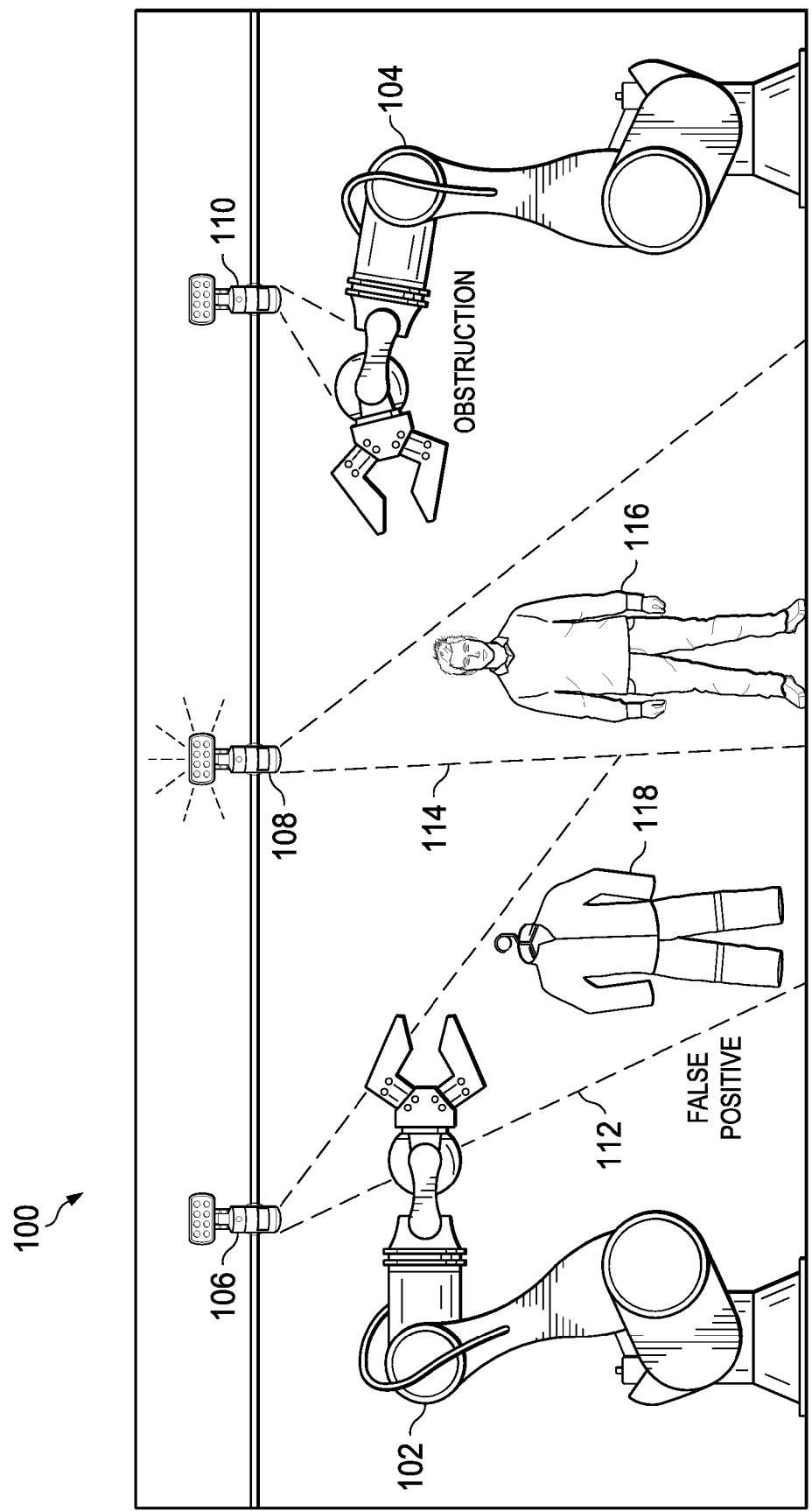
FIG. 1 illustrates a manufacturing environment, in accordance with an illustrative embodiment.

The illustrative embodiments recognize and take into account that companies which use industrial robots are generally aware of safety issues that arise when humans may interact with machines, particularly industrial robots in a manufacturing environment. One concern is what happens when humans get too close to an operating machine. Because of their size, complexity, and speed, safety is important. Thus, the advantageous embodiments provide for methods and devices that improve safety both for humans and equipment when humans are physically within the manufacturing environment in which the machines operate. Likewise, the advantageous embodiments provide for using human motion sensors to detect movement when in the vicinity of hydraulic robots.

The advantageous embodiments further recognize and take into account that when working around machinery such as robots, employees have the potential to place themselves unknowingly in undesirable positions, such as in a robot's motion path. This situation may occur more frequently if a robot interacts too closely with a human during an operation.

The advantageous embodiments further recognize and take into account that unauthorized access to areas where robots work can also create issues. It is desirable to increase safety for both the human in the unauthorized area and to prevent damage to the equipment.

The advantageous embodiments further recognize and take into account that most robotic work areas have safety mechanisms and protocols setup to protect workers. However, if someone is unaware of these procedures or forgets, they may not follow them.

The advantageous embodiments further recognize and take into account that sensors connected to the robot have been used to watches for movement generally. If movement is detected, then an alert is issued or operation of the machinery is halted. The problem with this approach is most sensors fail to identify objects accurately and as a result report many of false positives. Additionally, such sensors are not optimal in situations where the user is supposed to interact with the machine as part of the machine's normal operation.

The advantageous embodiments further recognize and take into account that a human shop foreman may monitor the robotic work area. If he or she sees someone entering this area, they could stop the robot or warn the person. However, the problem with this approach is the heavy reliance on the foreman, who temporarily may not be available. Furthermore, because manufacturing machines typically operate continuously all day and all week, the use of a human monitoring a robotic work area would be taxing, both physically and financially.

The advantageous embodiments further recognize and take into account that safety warning signs in the robotic work area may be posted. However, this approach puts the responsibility of the worker's safety into their own hands. This approach also presumes everyone will read, understand, and follow the warnings on the sign.

Thus, the advantageous embodiments address these and other issues. The advantageous embodiments use information collected from a human motion sensor to notify a machine a human is within its vicinity. Furthermore, the advantageous embodiments have the ability to distinguish between false positive objects and a true detection of a human. Additionally, the advantageous embodiments may daisy chain motion sensors together to avoid obstructions which might otherwise impede the recognition of human objects.

The advantageous embodiments also provide for taking into account false positives when identifying human beings. For instance, the advantageous embodiments may ignore selected points of articulation, allowing the system to instead focus on appendages which are more likely to be injured, such as fingers near a "hand press".

In another approach, "movement recognition" is used to identifying authorized workers or movements. The term "movement recognition" is to be distinguished from "motion recognition." Whereas "motion recognition" simply recognizes whether any kind of movement has occurred, "movement recognition" recognizes a specific movement, particularly of a human. Thus, the advantageous embodiments may perform "movement recognition" to identify if a human is walking or running. Using motion technology, the advantageous embodiments have the ability to learn the movements of authorized workers. This feature makes it possible to recognize movements which are acceptable to be nearby and those which are not. For example, the advantageous embodiments could identify a feeding motion as acceptable when feeding a robot parts. On the other hand, the advantageous embodiments could identify the movements associated with someone talking on a phone nearby and consider it inappropriate. Accordingly, the advantageous embodiments have the capability of picking and choosing which humans are in harm's way and which are not. Furthermore, the advantageous embodiment could determine the severity of the movement, such as someone walking in a restricted area, versus someone walking while talking on a cell phone in a restricted area. Details describing how to discriminate this type of behavior are given below with respect to the figures.

The advantageous embodiments may be varied. For example, the advantageous embodiments may daisy chain motion sensors together in order to avoid obstructions to sensors in a complex manufacturing environment.

The advantageous embodiments have a number of advantages and uses. The advantageous embodiments are flexible and relatively inexpensive to use. The advantageous embodiments provide a mechanism to help a manufacturer increase safety in factories where robots work. The advantageous embodiments may be combined with many different kinds of warnings, such as proximity alerts, sirens, lights, and system shutdowns. The advantageous embodiments may work with multiple robots or other machines simultaneously. The advantageous embodiments may be used to monitor robotic work areas. The advantageous embodiments are particularly useful in areas which have heavy non-human traffic because the advantageous embodiments are capable of recognizing the movements of just humans. The advantageous embodiments are language independent, scalable to large facilities, and universally deployable. The advantageous embodiments have other features, as described further below.

FIG. 1 illustrates a manufacturing environment, in accordance with an illustrative embodiment. Manufacturing environment 100 includes machine 102, machine 104, both of which are used to manufacture objects or assemblies. Machine 102 and machine 104 may be robots or other manufacturing equipment such as, but not limited to, hydraulic machines, arms, presses, tools, drills, saws, riveters, and many other automatic or semi-automatic devices. Manufacturing environment 100 may be particularly adapted to an aircraft manufacturing facility.

In an illustrative embodiment, sensors, such as sensor 106, sensor 108, and sensor 110 are used to detect humans and human movement in proximity to machine 102 or machine 104. Also shown in FIG. 1 are scan areas, such as scan area 112 and scan area 114, between which is the line of sight of a given sensor.

These sensors may be used to detect the presence, shape, or specific movements of human 116. However, a problem associated with any such detection system is the possibility of false positives caused by objects such as static clothing 118 which may be hanging from a wall.

Described differently, manufacturing environment 100 may be characterized as a human motion sensor or a sensor system used to detect the change in position of a human relative to his or her surroundings, or the change in the surroundings relative to a human. The KINECT® system from MICROSOFT CORPORATION® is an example of such a device.

As described above, machine 102 and machine 104 are mechanical devices used to complete industrial tasks. In a specific example, typically used in large scale manufacturing, hydraulic robots are automatically controlled, reprogrammable, multipurpose machines capable of moving in three or more axes. Typically, hydraulic robots have a large hydraulically-driven arm anchored to a base-like structure as shown at machine 102 and machine 104 in FIG. 1. Most hydraulic robots handle large repetitive tasks, such as welding, painting, and or molding. These machines can operate at high speeds and can carry heavy loads, making them ideal for manufacturing work. Such robots help manufacturers become more competitive and efficient, while reducing work related injuries caused by repetition.

Robots are widely used throughout many industries. Industrial robots usually operate 24 hours a day, 7 days a week. However, the persistent work of these machines can create issues humans. Because most robots operate completely unaware of their surroundings, improved safety systems are desirable.

Figure 2:
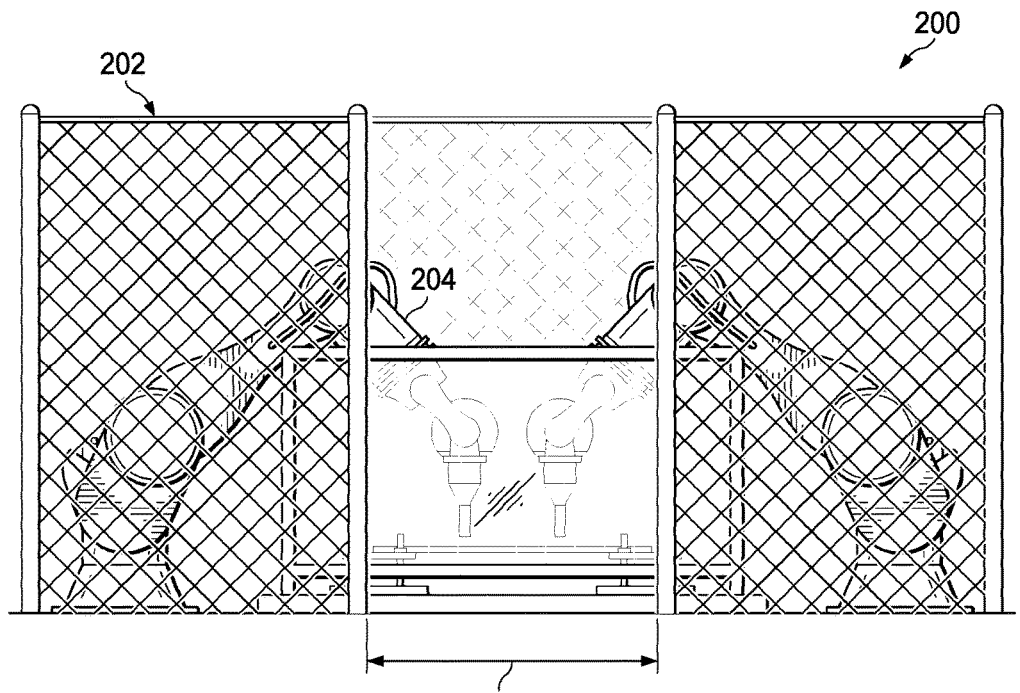
FIG. 2 illustrates an example of a manufacturing environment with a fence, in accordance with an illustrative embodiment.

FIG. 2 illustrates an example of a manufacturing environment with a fence, in accordance with an illustrative embodiment. Thus, manufacturing environment 200 may be manufacturing environment 100 of FIG. 1.

The most common approach to increasing safety in a manufacturing environment, such as manufacturing environment 100 of FIG. 1, is to create a fence surrounding a robot's work area, as fence 202 shown in FIG. 2. Fence 202 may prohibit people from getting too close, while machine 204 is working. Fence 202 may act as a visual reminder of the boundaries between the robots and employees.

Unfortunately, this approach is a static solution, as a worker, or an appendage could penetrate the fence without warning. Additionally, this approach is not appropriate when human interaction with machine 204 is part of the normal operation of machine 204.

In some cases, there are points of entry 206 where employees can easily enter manufacturing environment 200. However, this approach fails to account for workers who need to work closely with robots. In these cases, employees must enter the fenced area.

Other problems may exist for the current safety system. The most common problem is that sensors, such as motion sensors, may give many false positive indications at the movement of other machines or at the movement of humans authorized to be present. False positive results lead to unnecessary alarms and perhaps unnecessary shutdowns. Thus, false positive results are undesirable.

Figure 3:
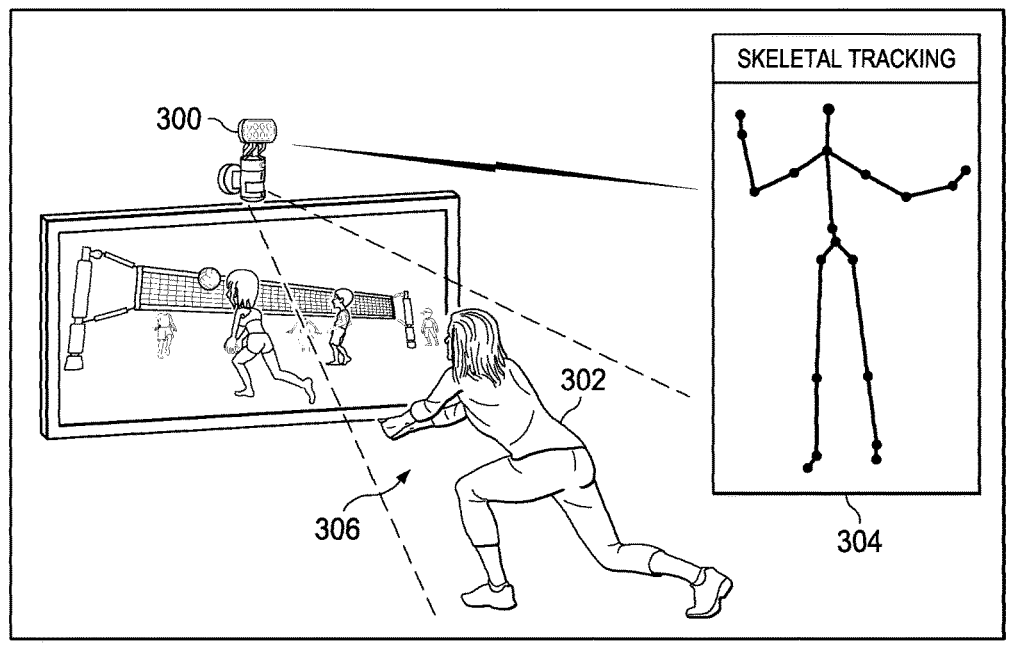
FIG. 3 illustrates an example of a human motion sensor, in accordance with an illustrative embodiment.

FIG. 3 illustrates an example of a human motion sensor, in accordance with an illustrative embodiment. Human motion sensor 300 may be used with a system for operating equipment in a manufacturing environment, such as manufacturing environment 100 of FIG. 1 or manufacturing environment 200 of FIG. 2.

The advantageous embodiments contemplate using human motion sensor 300 as shown in FIG. 3 to identify a human's movements. Human motion sensor 300 is configured to perform "movement recognition," as defined above. Human motion sensor 300 detects a change in a position of human form 302 relative to his or her surroundings 306. Examples of such devices include but are not limited to MICROSOFT® KINECT® and NINTENDO® WII U® are examples of human motion sensor 300.

In an illustrative embodiment, human motion sensor 300 detects the three-dimensional coordinates of the subject's movements in the form of a stick man or skeleton 304. This type of identification may be referred-to as skeletal tracking.

The purpose of human motion sensor 300 is to detect human movement recognition, unlike a typical motion sensor which just detects movement. In an illustrative embodiment, human motion sensor 300 detects a human-like form and collects the coordinates of points of articulation of the human's form. Then, human motion sensor 300 or a computer connected to human motion sensor 300 monitors that form for any movement. If any movement occurs, human motion sensor 300 reports the coordinates of that movement.

The coordinates typically relate to points of articulation or a subject's joints. In order to better translate the subject's movements, the advantageous embodiments correlate the coordinates, whether spherical or Cartesian, to a relative position so the measurements can be standardized if needed. For example, the advantageous embodiments contemplate using the head, torso, or hip as a relative position in order to standardize each subject. Working with relative positions is easier than calculating detailed coordinates in some cases, and thus pose computational advantages that the advantageous embodiments contemplate using.

Figure 4:
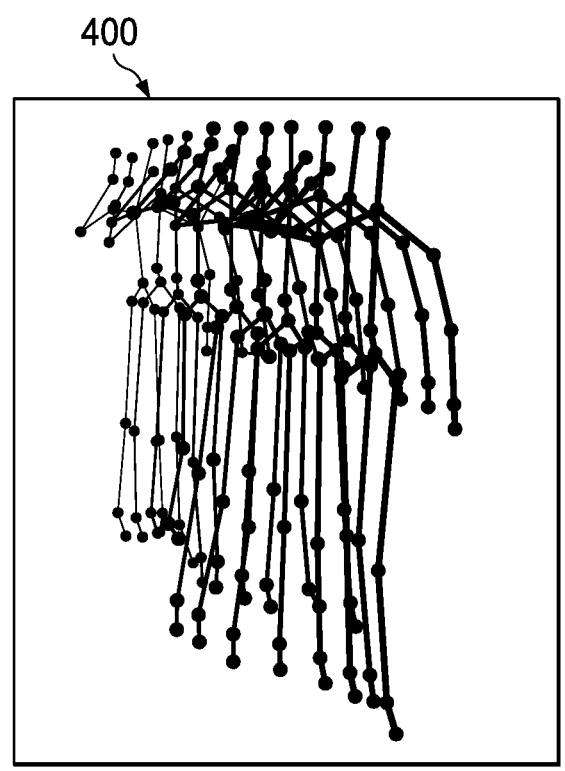
FIG. 4 illustrates movement/gesture recognition using an example of detection of a human walking while talking on a mobile phone using points of articulation of a human skeleton, in accordance with an illustrative embodiment.

FIG. 4 illustrates movement/gesture recognition using an example of detection of a human walking while talking on a mobile phone using points of articulation of a human skeleton, in accordance with an illustrative embodiment. Skeleton 400 could be another example of skeleton 304 representing the human form 302 of FIG. 3 generated by a human motion sensor such as human motion sensor 300 of FIG. 3.

Gesture recognition can be seen as a way for computers to try to understand human body language, thus building a stronger bridge between machines and humans relative to primitive text user interfaces or even graphical user interfaces (GUIs), which still limit the majority of input to keyboard and mouse. Gesture recognition uses computer technology along with mathematical algorithms to identify different human movements.

In the context of the advantageous embodiments, movement recognition goes well beyond just the identification of a gesture, such as someone waving their hand. Instead, the computer used in the advantageous embodiments actually defines a human motion or movement. This definition allows the computer to recognize actual movements, such as walking while talking on a cell phone, as shown in FIG. 4.

One way to accomplish this feat involves a learning process where systems classify a particular motion with a corresponding description. Other methods detect differences in motion with respect to their surroundings in order to determine what action is taking place. In either case, the end goal is to ascertain what a person is doing with regards to their motions.

Figure 5:
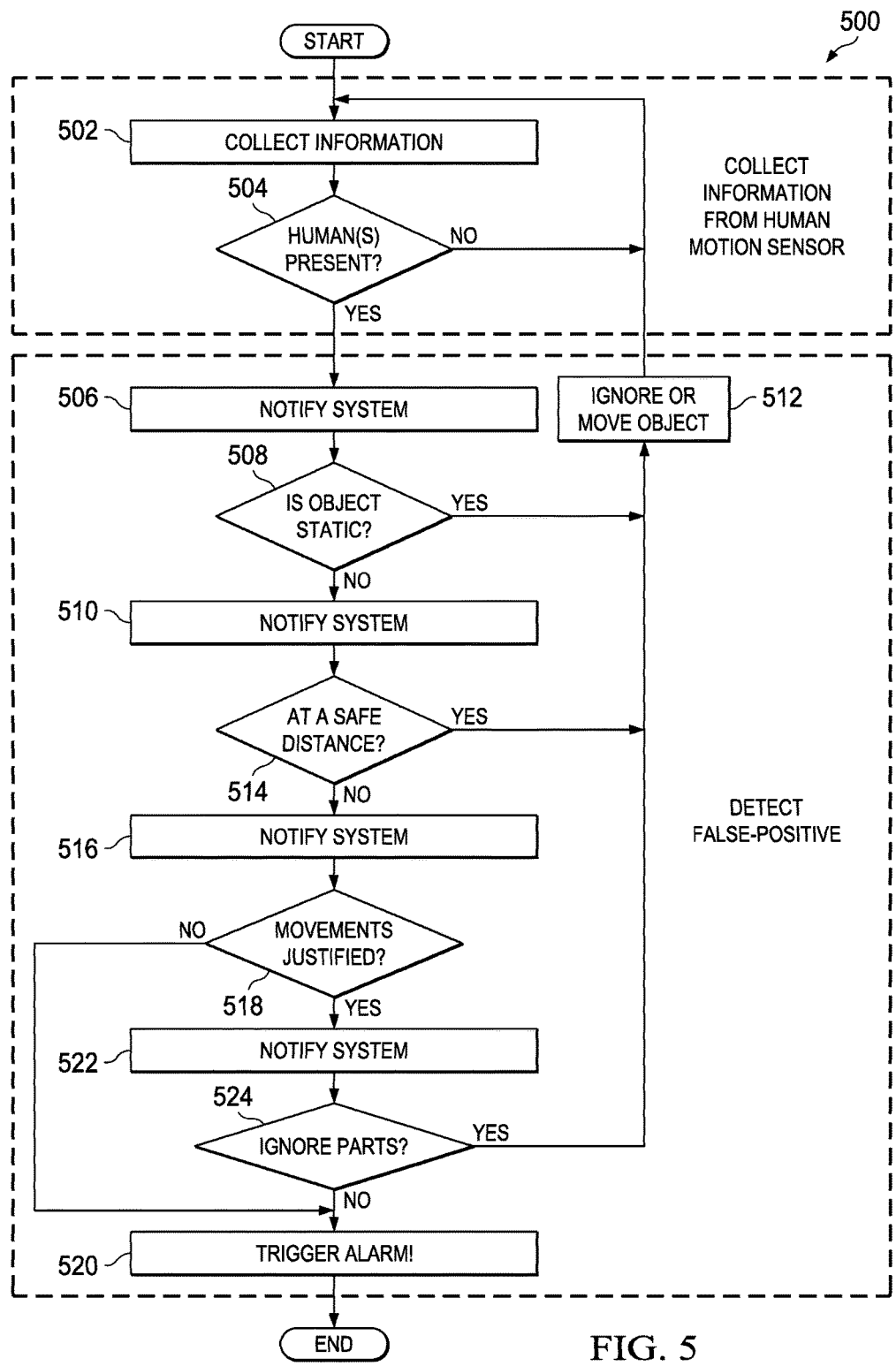
FIG. 5 is a flowchart of a process for eliminating false positive detection readings of a human in proximity to a machine, in accordance with an illustrative embodiment.

FIG. 5 is a flowchart of a process for eliminating false positive detection readings of a human in proximity to a machine, in accordance with an illustrative embodiment. Method 500 may be implemented using a computer in conjunction with a human motion sensor, such as human motion sensor 300 of FIG. 3.

The use of industrial machines such as hydraulic robots is quite common in large scale manufacturing. Companies use these machines to increase productivity, drive down costs, improve quality, and or accomplish heavy large-scale tasks. However, as these robots interact more with humans, safety concerns increase as well.

The advantageous embodiments address this issue by using a human motion sensor to detect if a human is in the vicinity of an operating machine, or is taking some action considered undesirable with respect to the machine. The computer then determines if a detected object is in fact a human, or a false positive result. A "false positive" result is a result in which something is detected and initially assumed to be human, but is not. False positives are very common in motion sensors, even human motion sensors. However, since issuing an alarm or halting operation of the machine unnecessarily is undesirable, false positives are undesirable. In any case, if the computer determines the object to be that of a human and in an undesirable position with respect to the machine, the computer can instruct the machine to stop working or issue a warning to the human. As used herein, the term "undesirable" means a movement which places the human at risk for interacting with the machinery in a manner which could result in injury to the human or damage to the machinery.

Returning to FIG. 5, method 500 begins with collecting information (operation 502). Based on the information the computer determines if humans are present (operation 504). If not, the process returns back to operation 502.

If so, the computer notifies the system or software configured to determine if the detected human represents a false positive result (operation 506). While a false positive result could occur for many different reasons, the advantageous embodiments contemplate at least four sources of false positive results. These include a static object mistaken to be a human, such as clothing, an object within the sensor's reach but at an acceptable distance from the machine, a motion or human which is considered justified, or a portion of a human which is considered to be justified. The following operations relate to ferreting out these false positives, though the advantageous embodiments contemplate additional steps to ferret out other types of false positives.

In this particular illustrative embodiment, after notifying the system at operation 506, the computer determines if the detected object is static (operation 508). If not, then the system is notified of this fact (operation 510). If so, that is if the object is static, then the system is instructed to ignore or have someone move the object (operation 512), at which case, the system then returns to operation collecting information 502.

However, if the system is notified that the detected object is not static at operation 510, then the system makes another determination whether the detected object is at an acceptable distance from the machine in question (operation 514). If not, then the system is again notified that the object is not at an acceptable distance (operation 516). If so, that is the object is at an acceptable distance, then the object is ignored or moved (operation 512) and subsequently the method returns to collecting information at operation 502.

Once the system is notified that the detected object, which is not static, is not at an acceptable distance from the machine, the system determines whether the objects movements detected by the sensor are justified (operation 518). If not, then an alarm is triggered (operation 520). The alarm may be visual, audio, both, or some other alarm configured to inform the human that action should be taken to avoid the machine. Alternatively, or in addition, operation of the machine is halted or modified in a manner calculated to increase safety of the presumed human, the machine, other equipment or power supplies, and combinations thereof.

However, returning to operation 518, if the movement is considered justified then the system is so notified (operation 522). A movement is considered justified if the computer has been pre-programmed to recognize a movement as being justified. For example, the detected skeletal positions of a human body may indicate that the person is performing a feeding motion with respect to feeding a machine. This motion is considered part of the normal operation of the machine and thus is justified. In another example, motions such as standing up, stretching, waving, or kneeling might be considered justified. All motions are considered unjustified except for those motions defined as justified, such as for example inserting a hand or other body part into an operating part of the machine or walking into an unauthorized area. Furthermore, just as the system can be trained to recognize justified movements, it can also be training to recognize "undesirable" movements, which like unjustified movements, would trigger an alarm (operation 520). Alarms for undesirable movements could be more significant and severe. Again, as used herein, the term "undesirable" means a movement which places the human at risk for interacting with the machinery in a manner which could result in injury to the human or damage to the machinery.

Returning to method 500, after notifying the system that the motion is justified at operation 522, the computer or system determines whether to ignore body parts (operation 524). The system ignores certain parts of the body if the system has been instructed to do so, such to ignore motion of the head but to pay attention to motion of the hands. If the system determines that a body part should be ignored, then method 500 returns to operation 512 to ignore or move the object and from there returns to operation 502 to continue collecting information. Otherwise, the system triggers an alarm (operation 520), or modifies operation of the machine, or takes some other action as described above.

In any case, once the arm is triggered at operation 520, the method may terminate thereafter. Alternatively, the method may return to operation 502 and continue collecting information, especially in the case where the system governs or manages many different machines at once.

In addition to warning the subject, the system also serves as feedback mechanism, whereby employees learn to distance themselves from machines or learn better movements with respect to operating machinery. Additionally, the feedback works both ways, as the system itself learns as well. In particular, the system may use machine learning with respect to movements, proximities, and surrounding objects. Thus, the system may determine new movements which may be considered safe. Ultimately, these actions will prevent a human, or possibly other machinery in a manufacturing environment, from being hurt or damaged while creating a safe work environment.

Thus, the advantageous embodiments describe the process of detecting human movement when in the vicinity of machines rather than the basic core technologies one uses to accomplish this task. The advantageous embodiments have the ability to detect movements by using an interface to a human motion sensing input device. This interface can vary in scope and functionality, but preserves the job of recognizing a human in whatever capacity the sensor can handle.

The advantageous embodiments may work with a plurality of people simultaneously with a plurality of machines. Likewise, the advantageous embodiments may identify a plurality of movements of each of the persons in the manufacturing environment. The advantageous embodiments also contemplate identifying safe motions of vehicles or other moving machinery in a manufacturing environment.

The advantageous embodiments could be used anywhere where safety could be improved among machines or people interacting with each other. Thus, for example, the advantageous embodiments could be used in a commercial kitchen or a laboratory or other environment where interaction with powerful machines, fire, or chemicals occurs.

When a human is detected and common false positive results are eliminated, the advantageous embodiments contemplate many different actions which may or may not be combined or taken exclusively. Such actions include an alert, an alarm, or modification of operation of the machine, including slowing, halting, movement of the machine to another location, movement of the machine in a different direction, halting or modifying part of the machine, or many other actions.

The human motion sensors used with respect to the advantageous embodiments may be located in any advantageous position. Examples of such positions include but are not limited to on the machine or robot, on a ceiling or wall of a manufacturing facility, on the floor, on stands, or even potentially on the humans themselves who move in the manufacturing environment.

The advantageous embodiments may be implemented using software operating on a computer in communication with a human motion sensor and possibly in conjunction with the manufacturing machine. The software may be written in any convenient language, though JAVA® is specifically contemplated for portability purposes. However, other programming languages could be used. Additionally, the advantageous embodiments could be implemented using a special purpose computer or application specific integrated circuit, and thus may take the form of a purely hardware embodiment.

Figure 6:
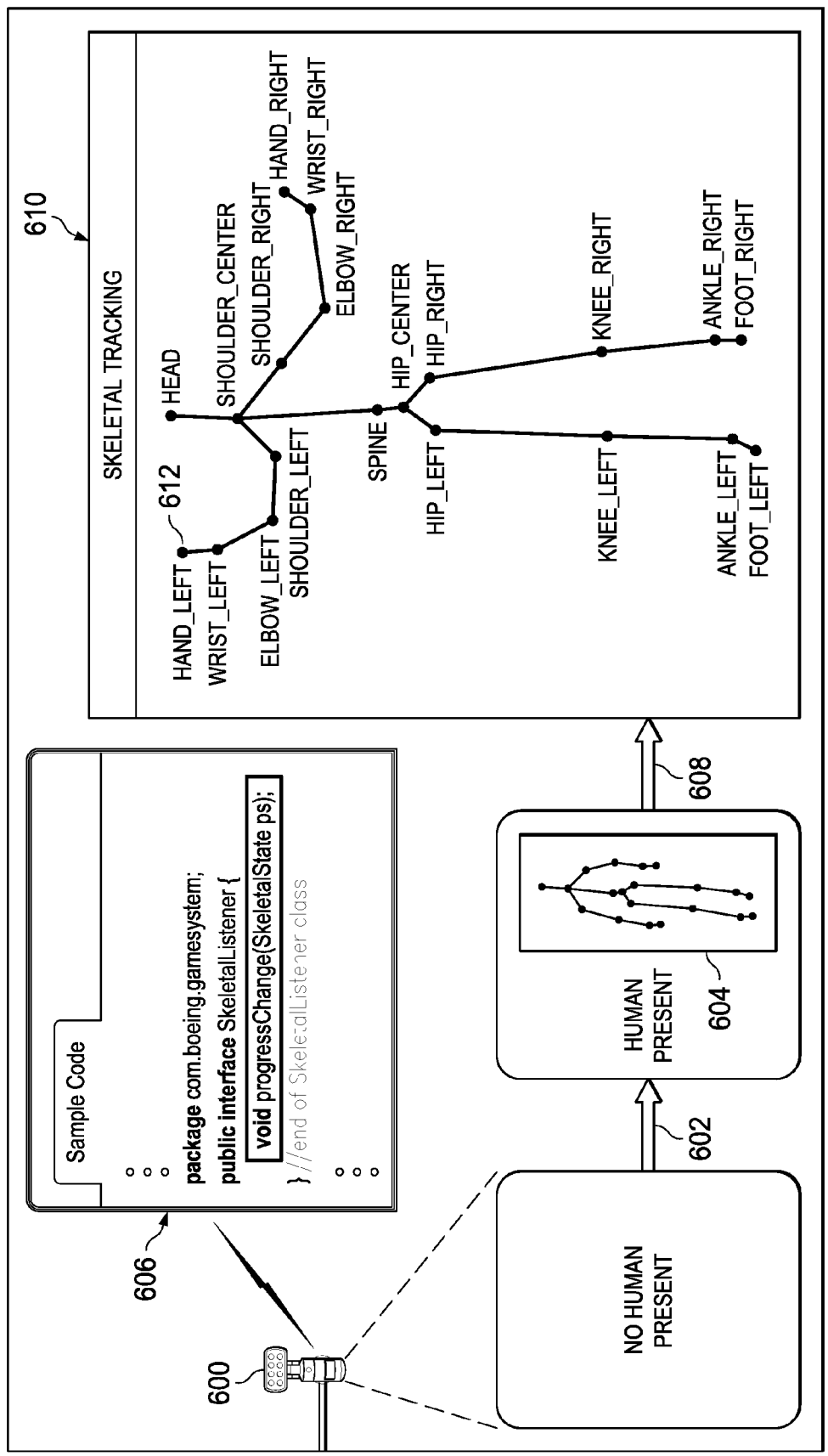
FIG. 6 illustrates an example of detecting points of articulation of a human skeleton, in accordance with an illustrative embodiment.

FIG. 6 illustrates an example of detecting points of articulation of a human skeleton, in accordance with an illustrative embodiment. Human motion sensor 600 may be, for example, human motion sensor 300 of FIG. 3 and may be used in a method in a manufacturing environment, such as method 500 of FIG. 5. The advantageous embodiments described with respect to FIG. 6 provide further details regarding the detection of and movement tracking of points of articulation on a human frame or skeleton.

As indicated above, the advantageous embodiments use information collected from a human motion sensor, such as human motion sensor 600. As soon as human motion sensor 600 recognizes an object as human-like, as indicated by arrow 602, it sends a signal to a computer or software that a human is present, as indicated at skeleton 604.

The computer uses listener 606 to translate or interpret that signal into information it can use. Listener 606 takes the form of software or hardware configured to perform the functions described herein. Human motion sensor 600 passes the information collected by human motion sensor 600 to other software or hardware for identifying articulations, as indicated by arrow 608. This other software or hardware constructs identifiers, for the shape of stick-man or skeleton 610, for each joint. The other software or hardware uses this information to determine the validity of the human-like object.

The identifiers may be text-only identifiers, which are associated with relative positions defined by text, for ease of later processing. Thus, for example, the upper left point of articulation shown in the figure is HAND_LEFT 612 in skeleton 610. HAND_LEFT 612 may be associated with specific positions that correspond to a range of spatial coordinates. For example, HAND_LEFT 612 could be given relative positions defined by text, such as "HIGH", "LOW", "SOMEWHAT_HIGH", "NEAR_HEAD", "AWAY_FROM_HEAD", "POINTING_DISTALLY", or potentially many other text descriptors. Thus, when the computer is detecting either human positions or human movements or both, the computer compares specific patterns of these text descriptions to known patterns for which the computer or the software are trained. In a more specific example, when HAND_LEFT 612 is "NEAR_HEAD" and "HIGH" the computer is trained to return a result that the human may be holding a mobile phone to his or her head, and take action accordingly.

Described differently, the advantageous embodiments are distinguished from motion sensors which detect only the fact that motion has occurred. The advantageous embodiments contemplate using the above technology to track movements of a form and points of articulation of that form to identify human behaviors and positions. This technology is referred to as movement detection, as opposed to motion detection.

Thus, the advantageous embodiments track the form's movements using points of articulation, joints, and extremities as identifiers. The advantageous embodiments outline these identifiers in the shape of a stick-man or skeleton. Typically, each identifier would include a label (such as HAND_LEFT 612), an XY or XYZ coordinate and a distance. This type of identification may be referred to as skeletal tracking.

Human motion sensor 600 detects human-like objects first, then motion. So, it is possible to detect something human-like which is not moving. For example, the advantageous embodiments could detect a motionless person in its vicinity when initially turned on. Furthermore, the advantageous embodiments could initiate when someone triggers an event, such as entering a fenced work area, as described with respect to FIG. 2.

Figure 7:
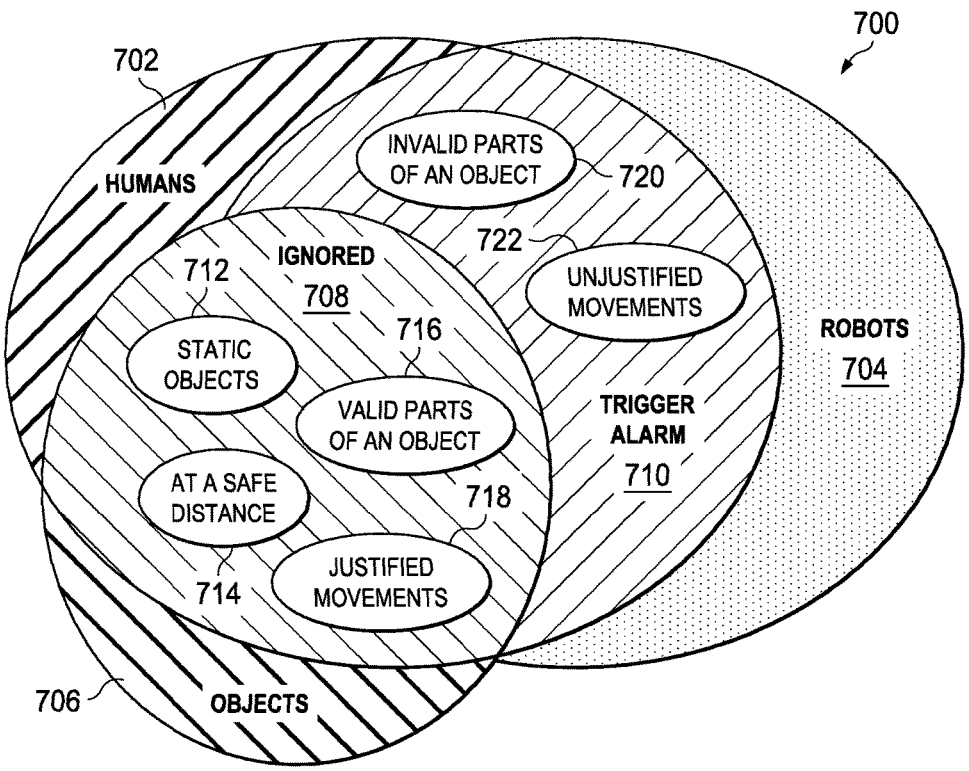
FIG. 7 is a Venn diagram illustrating false positive detections of a human in proximity to a machine, in accordance with an illustrative embodiment.

FIG. 7 is a Venn diagram illustrating false positive detections of a human in proximity to a machine, in accordance with an illustrative embodiment. Venn diagram 700 is an aid to understanding the types of false positives that may arise in a human movement detection system, false positives that should be eliminated if possible.

As indicated, when the computer receives a signal from the human motion sensor, it is possible the signal is a false positive. A false positive is something which the system thinks is human, but is actually not, such as, for example, a rain coat hanging on a wall. False positives are surprisingly common in human recognition software.

Venn diagram 700 illustrates the interactions between humans 702, robots 704, and objects 706. When a human or object interacts with a robot, it is either ignored 708 or an alarm is triggered 710 (or some other action taken with respect to the robot or other machine). Moreover, the computer ignores static objects 712, objects at an acceptable distance 714, valid parts of an object 716, and justified movements 718. For invalid parts of an object 720 and unjustified movements 722, the computer may instruct the machine or robot to stop working or otherwise modify its operation.

In order to handle the numerous ways a human motion sensor can potentially identify an object as a false positive, in one example the invention utilizes four distinct methods, depending on how the object presents itself. At first, if the object is static, such as a rain coat hanging on a wall, a user can instruct the computer to ignore it. Secondly, if the object is moving or static but at an acceptable distance from the operating robot, a user can instruct the invention to ignore them. Thirdly, if the object is moving, but its movements are justified, a user can instruct the computer to ignore all objects which share the same movements as the identified object. Finally, if parts of an object are more [or less] important than other parts, a user can instruct the computer which parts to detect and which to ignore.

Figure 8:
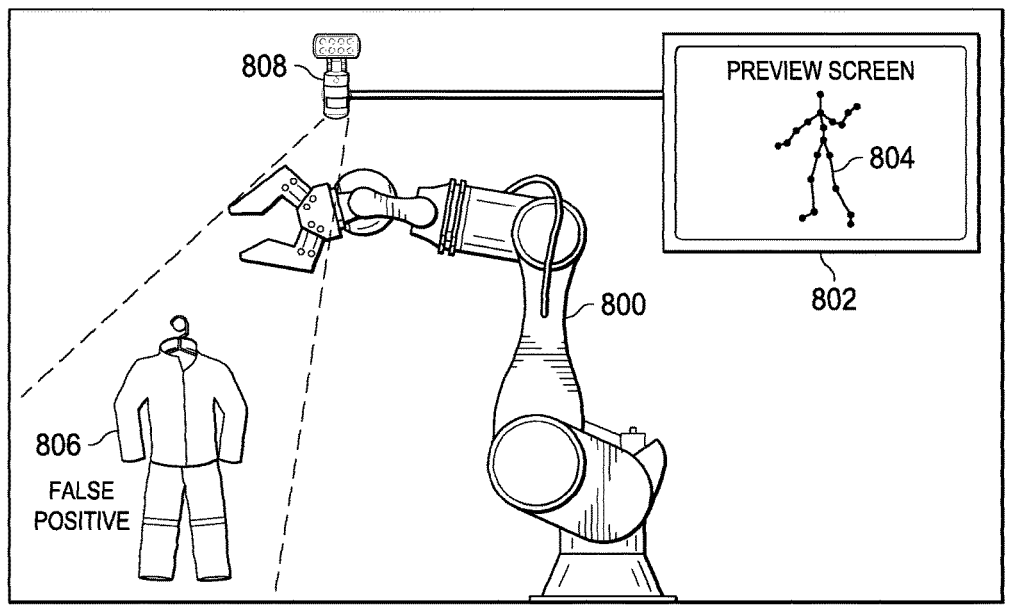
FIG. 8 illustrates an example of a false positive detection of a human in proximity to a machine, in accordance with an illustrative embodiment.

FIG. 8 illustrates an example of a false positive detection of a human in proximity to a machine, in accordance with an illustrative embodiment. Machine 800 may be, for example, machine 102 or 104 of FIG. 1 or machine 204 of FIG. 2.

In an illustrative embodiment, the computer may display on preview screen 802, stick-man silhouette 804 in the place where it detected object 806. If object 806 identified was not human, then the user would consider it a false positive.

In the case of a static object identified by the invention as a false positive, there are at least two ways to correct the situation. First, if it's possible, move the object away from the scan area of the motion detector, object 806 should be moved. Otherwise, the computer may be instructed to ignore object 806.

To ignore a static object, the computer collects all the identifiers in the skeletal tracker associated with that object, as detected by human motion sensor 808. The computer records these identifiers as "safe" and ignores any object which contains them. This kind of detection would occur before the operational use of the advantageous embodiments. In essence, one would sweep the area of false positive static objects, before starting a machine in a manufacturing environment.

Figure 9:
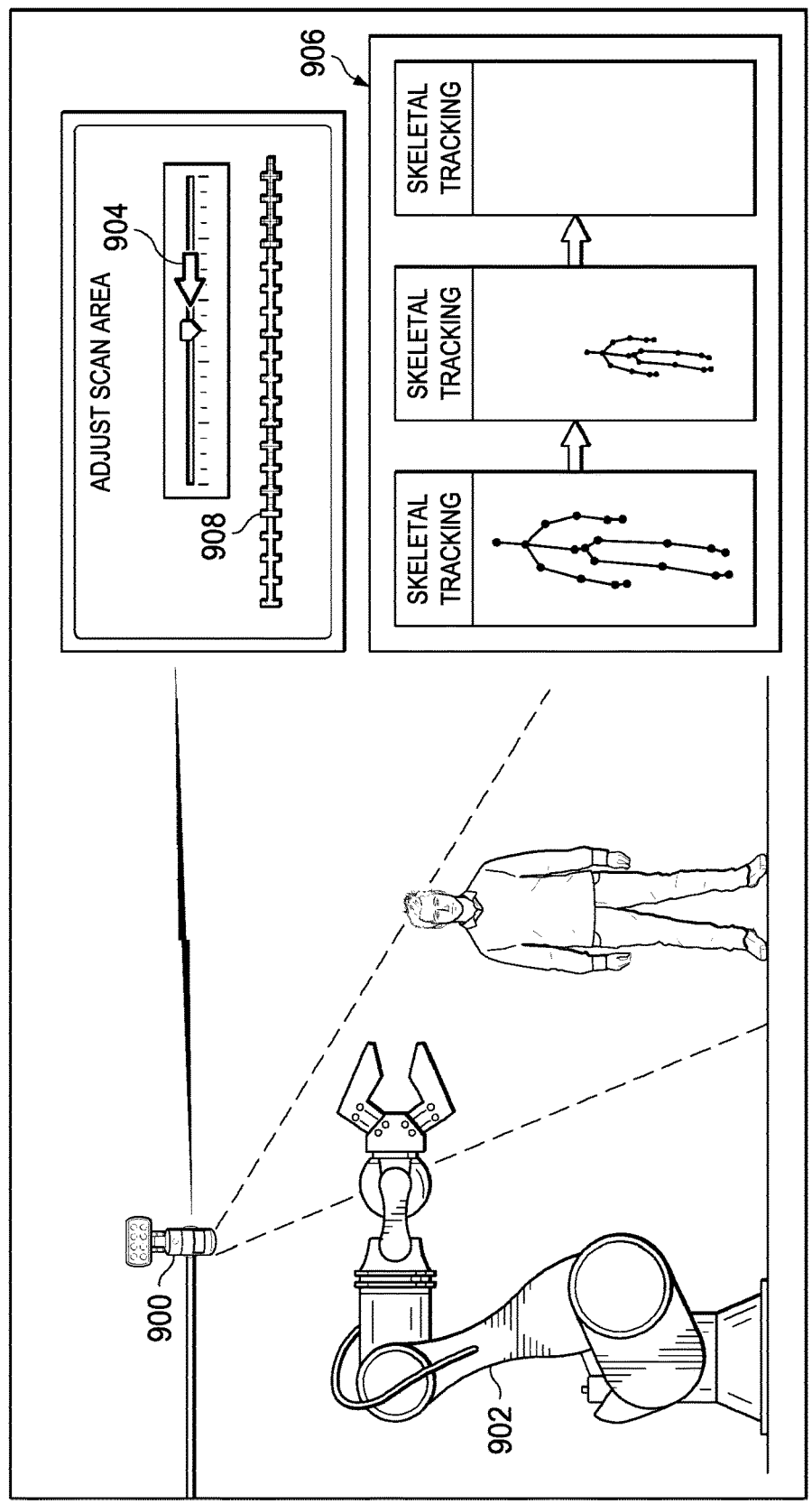
FIG. 9 illustrates another example of a false positive detection of a human in proximity to a machine, in accordance with an illustrative embodiment.

FIG. 9 illustrates another example of a false positive detection of a human in proximity to a machine, in accordance with an illustrative embodiment. Thus, human motion sensor 900 may be human motion sensor 300 of FIG. 3, and machine 902 could be machine 102 or 104 of FIG. 1 or machine 204 of FIG. 2.

In an illustrative embodiment, the computer should not consider objects identified at an acceptable distance from an operating machine, even if such objects are within the scanner's reach as targets, regardless if they are false positives or not. As shown in FIG. 9, the computer allows the user to adjust the scan area of the motion detector or motion sensor, as shown at arrow 904. In this manner, skeletal tracker software 906 only picks up objects at a certain proximity of an operating machine.

Furthermore, users can assign a severity, as indicated by scale 908, to the scanner's range as well. The computer can cause the severity to increase the closer an object gets. In these cases, the computer could issue a warning or modify operation of the machinery when the severity reaches a predetermined range. Additionally, different actions could be taken at different measurements of severity, from issuing an alert at a first severity, to modification of the machine at a second higher severity, to halting of the machine at a third even higher severity. Furthermore, the computer could initiate proximity alerts as a subject nears an operating machine. The alerts could intensify as the subject gets closer and closer.

Like static objects, another remedy would be to move the object out of the motion detector's scan path. Preferably this kind of action should occur before the operational use of the advantageous embodiments. In essence, one would sweep the area of detected distant objects, before starting a machine.

Figure 10:
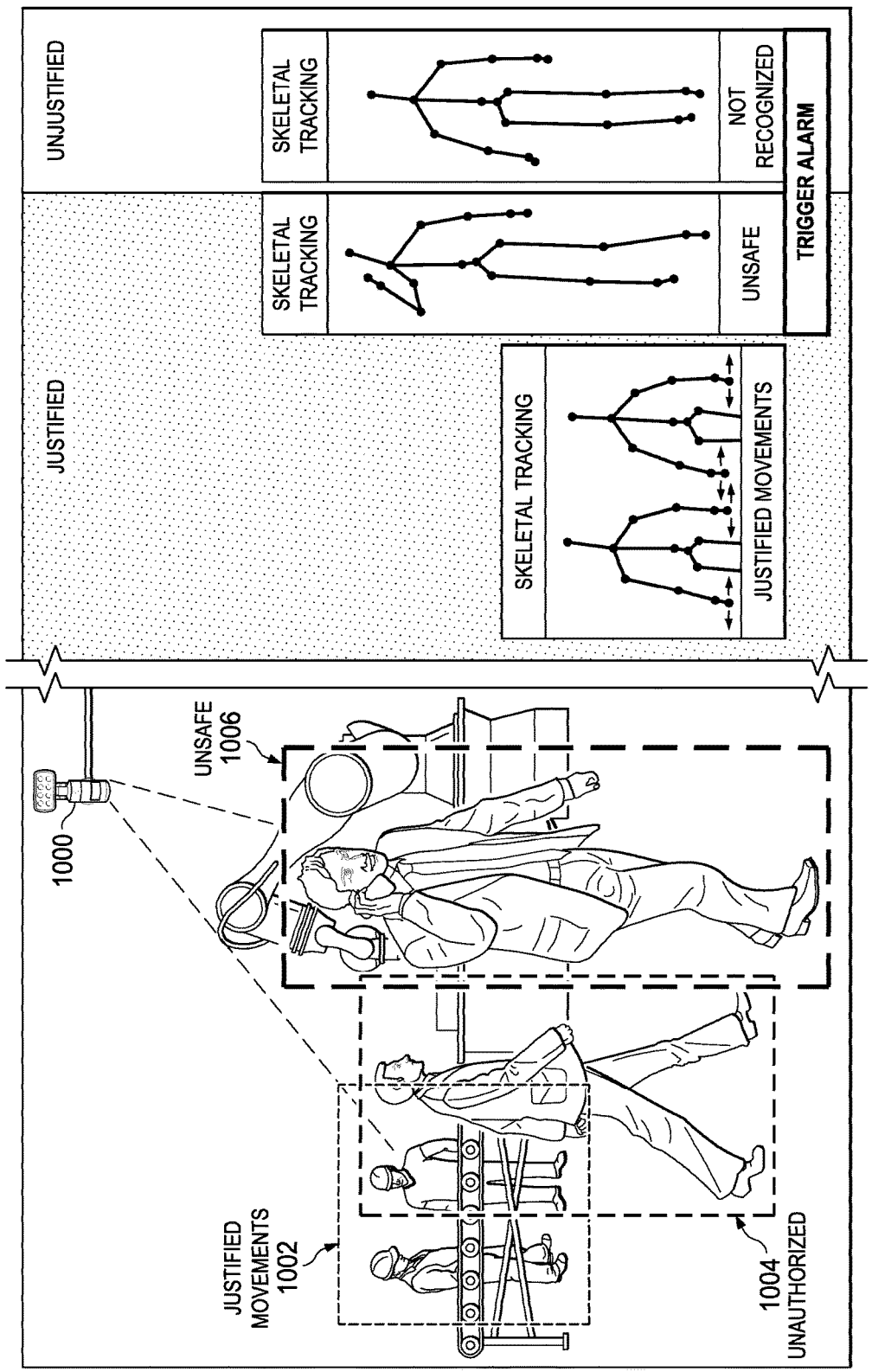
FIG. 10 illustrates examples of justified movements, unjustified movements, and undesirable movements, in accordance with an illustrative embodiment.

FIG. 10 illustrates examples of justified movements, unjustified movements, and undesirable movements, in accordance with an illustrative embodiment. Arrow 1002 are justified movements detected by human motion sensor 1000 which are pre-defined as being acceptable such that an alert is not issued and modification of operation of the machine is not performed. Human motion sensor 1000 may be human motion sensor 300 of FIG. 3, for example.

As indicated above, in some cases an individual is authorized to be near or take a specified action with respect to an operating machine. For example, workers may need to feed parts to a machine, as shown in FIG. 10 at arrow 1002. In order to address this concern, the computer uses "movement recognition" to identify movements that are predetermined to be justified or safe.

On the other hand, if an unauthorized movement, such as that of a human walking at an unauthorized space near a machine as indicated at arrow 1004, was detected, then the computer would activate an alarm or modify operation of the machine. In the same way, the computer can learn a safe or acceptable movement; it can also learn or recognize an undesirable movement, as indicated by arrow 1006. An example of an undesirable movement may be walking while talking on a mobile phone, or perhaps carrying something, or any other movement predetermined to be undesirable.

The computer could initiate specific alarms for different types of movements. As a result, the computer could look for undesirable behaviors as well as unapproved behaviors or positions or movements, while taking a different action for each.

Thus, using motion sensing technology and skeletal tracking, the computer has the ability to learn certain movements. The computer identifies each learned movement as a justified movement or undesirable movement. The computer then compares the data received from human motion sensor 1000 to the known justified or undesirable movements, and then classifies each given input from the human motion sensor 1000 as justified or to be ignored. In an illustrative embodiment, if a movement is not recognized, the computer will consider it an unjustified movement and trigger an alarm or cause modification of the operation of the machine. Both unjustified and undesirable movements trigger alarms or cause modification of the operation of the machine.

Note that the computer learns the "movements" and not the people making them. This fact allows anyone to perform the recognized movement.

Note also that the advantageous embodiments may be adapted to analyze the movements or behavior of points of articulation on a robot or other machine. If the robot or other machine starts to operate in an unintended manner, the advantageous embodiments may recognize this fact and issue an alert or modify the operation of either the machine in question or of other machines in proximity to the machine in question. Thus, the advantageous embodiments are not necessarily limited to the examples described above.

Figure 11:
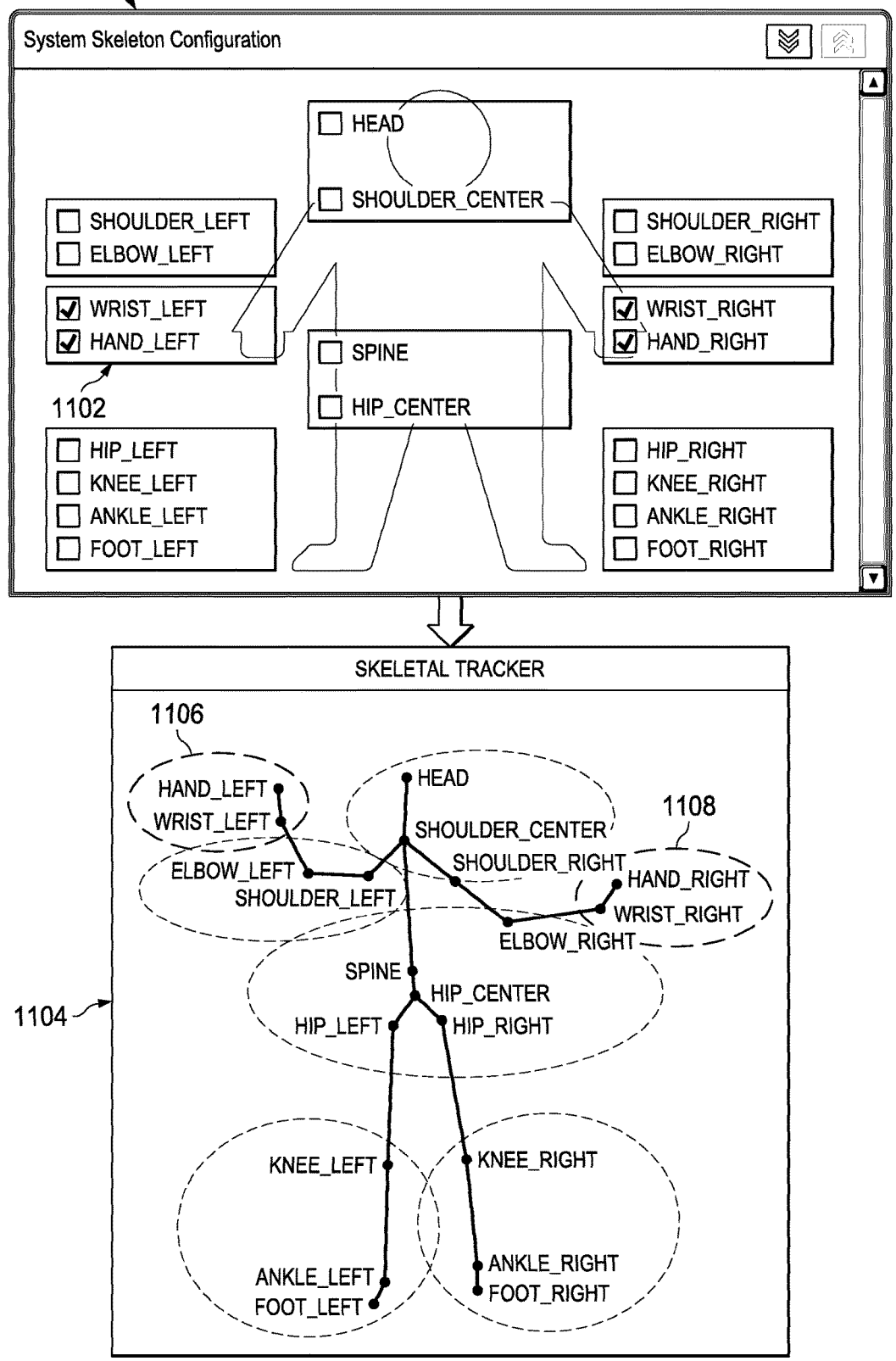
FIG. 11 illustrates an example of selecting points of articulation on a human skeleton while ignoring other points of articulation, in accordance with an illustrative embodiment.

FIG. 11 illustrates an example of selecting points of articulation on a human skeleton while ignoring other points of articulation, in accordance with an illustrative embodiment. The points of articulation may be as described with respect to FIG. 4, FIG. 9, or FIG. 10.

There are circumstances where even justified workers could benefit from increased safety. When working close to an operating machine, safety may be a concern. For that reason, the computer can focus on certain appendages which are more likely to be injured, such as fingers near a hand press, or some other body part near a pneumatic drill. Using a graphical user interface 1100, a user can configure the computer to inform it what to detect and what to ignore (checkboxes 1102). The graphical user interface 1100 uses an outline of a human body with identified points of articulation. A user can turn each point on or off, making it detectable or not, such as, for example, as indicated at (checkboxes 1102). These points mirror the identifiers captured by the stick-man or skeleton, in skeletal tracker 1104.

FIG. 11 shows a particular example of a configuration. In this configuration, a person's HEAD, SHOULDER_CENTER, SHOULDER_LEFT, ELBOW_LEFT, SHOULDER_RIGHT, ELBOW_RIGHT, SPINE, HIP_CENTER, HIP_LEFT, KNEE_LEFT, ANKLE_LEFT, FOOT_LEFT, HIP_RIGHT, KNEE_RIGHT, ANKLE_RIGHT and FOOT_RIGHT are ignored. When these points of articulation are near a machine, no alarm is triggered nor is machine operation modified. By selecting WRIST_LEFT, HAND_LEFT, WRIST_RIGHT and HAND_RIGHT, the computer will track these points of articulation such that when they are closer than a predefined distance to the machine an alert will trigger or operation of the machine will change. In this manner, only the hands or wrists of an individual will activate an alarm or stop an operating machine.

As shown in FIG. 11, a user may use graphical user interface 1100 to select which points of articulation may be tracked. Thus, for example, each point of articulation may be associated with a given check box. In this example, the user has checked certain check boxes of body parts to be tracked, such as checkboxes 1102. Another view of this result is skeletal tracker 1104, which shows circle 1106 and circle 1108 as being included in the tracked body parts and the remaining circles as being untracked.

This principle may be combined with a severity scale, as described with respect to FIG. 9. Thus, for example, the computer may be configured to track only certain body parts or only certain motions, and measure the severity (possibly the degree of proximity to the machine) of each body part. Thus, for example, if the hand is at a first distance from a press an alarm triggers, but if the hand is at a second, closer distance from the press then operation of the machine may be automatically stopped. The advantageous embodiments contemplate many other examples, and thus the above examples do not necessarily limit the other advantageous embodiments or the claimed inventions.

Figure 12:
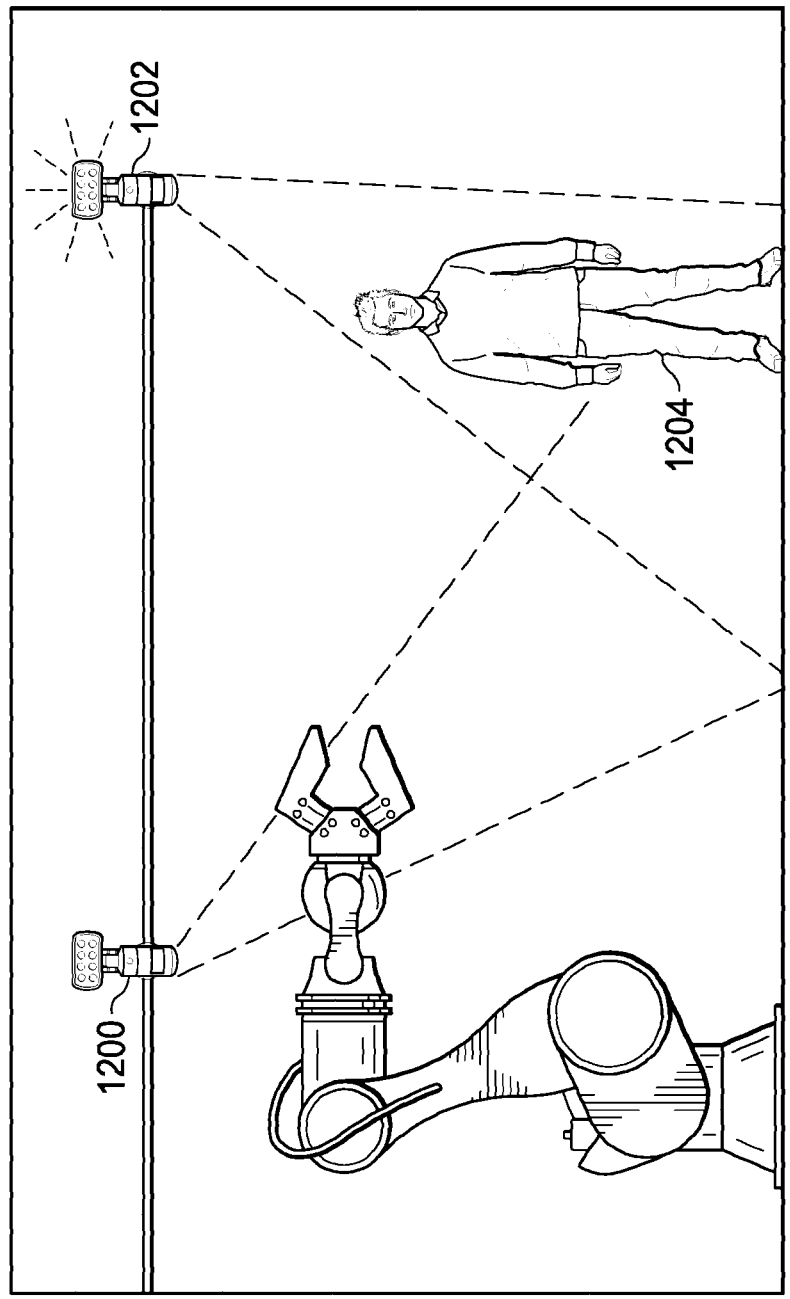
FIG. 12 illustrates an example of daisy chained motion sensors, in accordance with an illustrative embodiment.

FIG. 12 illustrates an example of daisy chained motion sensors, in accordance with an illustrative embodiment. In this illustrative embodiment, two sensors are present, human motion sensor 1200 and human motion sensor 1202. Each of these sensors may be, for example, human motion sensor 300 of FIG. 3.

As shown in FIG. 12, it is possible to daisychain human motion sensors in order to avoid obstructions, or to provide overlapping or redundant coverage. Thus, if something were to block human motion sensor 1200, human motion sensor 1202 could still track or detect person 1204.

Figure 13:
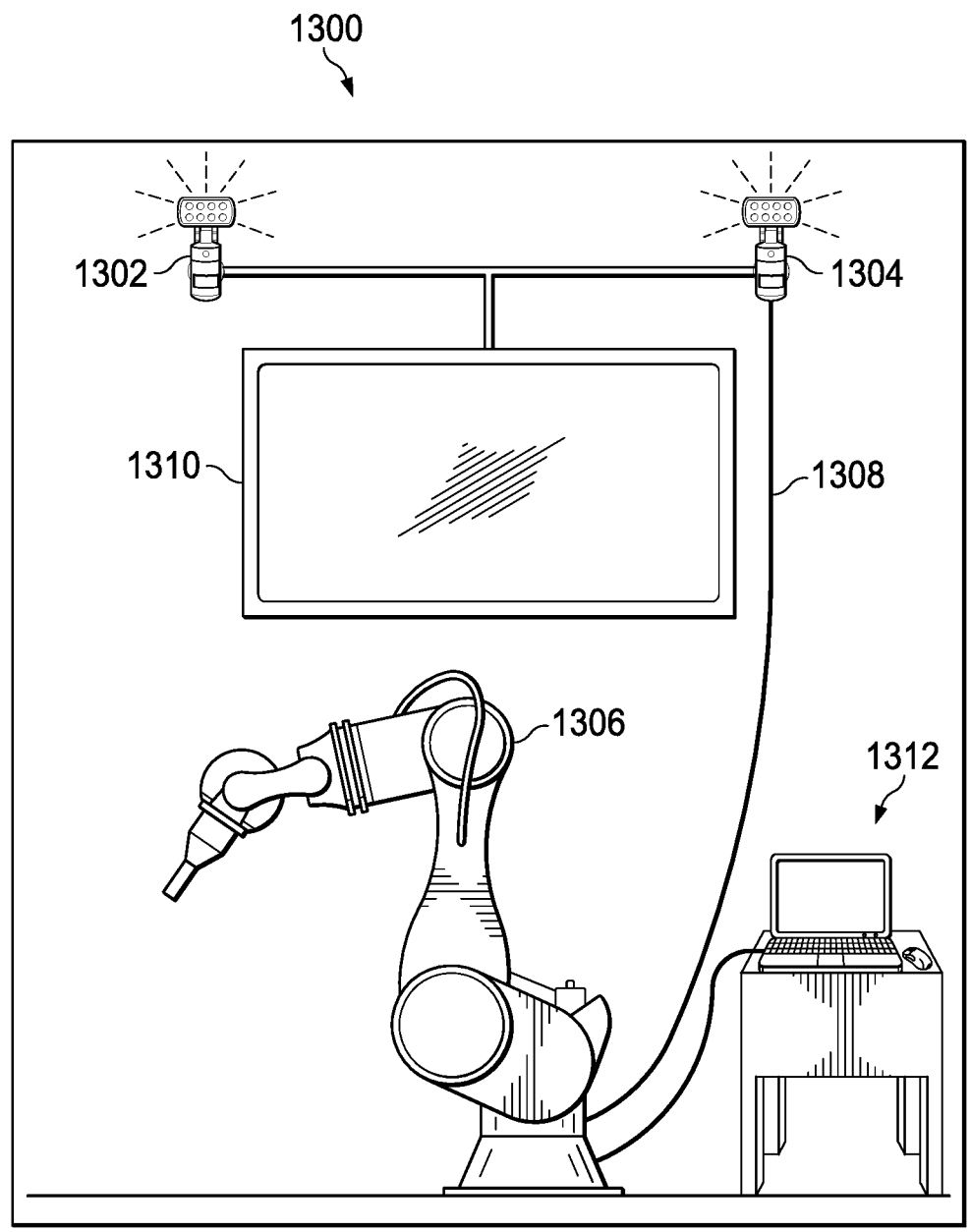
FIG. 13 illustrates a possible example of a system for operating machinery in a manufacturing environment, in accordance with an illustrative embodiment.

FIG. 13 illustrates a possible example of a system for operating machinery in a manufacturing environment, in accordance with an illustrative embodiment. System 1300 may be used to implement a method for operating machinery in a manufacturing environment, such as for example method 500 of FIG. 5. The manufacturing environment could be, for example, manufacturing environment 100 of FIG. 1 or manufacturing environment 200 of FIG. 2.

In the illustrative embodiment of FIG. 13, one or more human motion sensors, such as human motion sensor 1302 or human motion sensor 1304, is connected to machine 1306. Human motion sensor 1302 and human motion sensor 1304 could be human motion sensor 300 of FIG. 3. The sensor's connection, as indicated by wire 1308, could plug directly into the machine or into an interface provided by the machine. The connection could also be to computer 1310, which serves as an intermediary between human motion sensor 1302 or human motion sensor 1304 and machine 1306.

Optionally, computer 1310 could display on a display device a skeleton with tracked points of articulation, thereby allowing people to observe what the computer is tracking based on input from human motion sensor 1302 or human motion sensor 1304. This display could also flash warnings if someone were to get too close to an operating machine. There could also be audible alerts. Computer 1310 could also order machine 1306 to modify or halt operation as a result of tracked motion of a human, as described above.

Finally, the advantageous embodiments contemplate using laptop 1312 to install, configure and or optimize the system. Laptop 1312 could connect to the machine via a physical plug or through a secured network connection. Thus, the advantageous embodiments are not necessarily limited to a dedicated computer or computer 1310.

Figure 14:
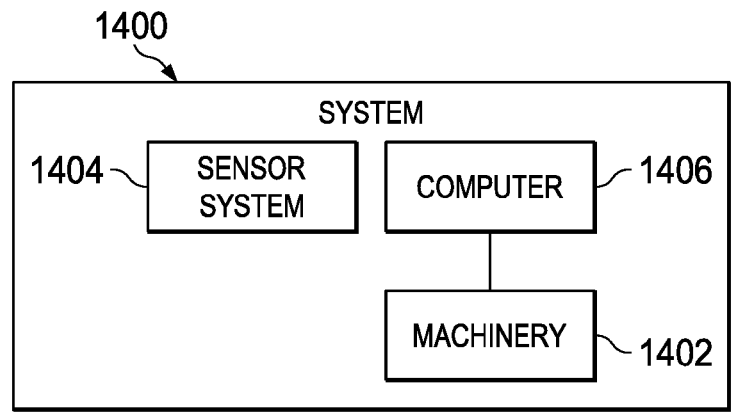
FIG. 14 illustrates another system for operating machinery in a manufacturing environment, in accordance with an illustrative embodiment.

FIG. 14 illustrates another system for operating machinery in a manufacturing environment, in accordance with an illustrative embodiment. System 1400 may be used to implement a method for operating machinery in a manufacturing environment, such as for example method 500 of FIG. 5. The manufacturing environment could be, for example, manufacturing environment 100 of FIG. 1 or manufacturing environment 200 of FIG. 2. System 1400 may be an alternative to system 1300 of FIG. 13.

System 1400 is a system for operating machinery in a manufacturing environment including machinery 1402. System 1400 includes sensor system 1404 configured to distinguish human skeletal positions from non-human object positions. Sensor system 1404 is further configured to determine whether one or more humans are present in a predetermined area. Sensor system 1404 may be a human motion sensor system. Sensor system 1404 may also track movements of a human using points of articulation on a skeleton.

System 1400 includes computer 1406. Computer 1406 is configured to: responsive to determining that only the one or more humans are in the predetermined area, determine whether a false positive result has occurred. The false positive may be a first determination that the one or more humans are present when no human is actually present. Computer 1406 is also configured to: responsive to determining that the false positive result has not occurred, take an action selected from the group consisting of issuing an alert, stopping machinery 1402, or a combination thereof. Thus, computer 1406 is connected to machinery 1402.

This illustrative embodiment may be modified or expanded. For example, computer 1406, in being configured to determine whether one or more humans are present the predetermined area, computer 1406 is further configured to: use sensor system 1404 to track a plurality of points of articulation of the skeletal positions of the one or more humans to create tracked points of articulation. In this case, computer 1406 is programmed to compare the tracked points of articulation to known sets of points of articulation. Computer 1406 is further configured, responsive to the tracked points of articulation match at least one of the known sets of points of articulation, to determine that only the one or more humans are present in the predetermined area.

In related illustrative embodiment, computer 1406 is further configured to: change the alert responsive to a second determination by computer 1406 that the tracked points of articulation correspond to a forbidden skeletal position of the one or more humans. Still further, the forbidden skeletal position may be selected from the group consisting of: a first position corresponding to speaking on a mobile communicator, a second set of positions corresponding to running, a third set of positions corresponding to moving in a particular direction relative to machinery 1402, and a fourth set of positions corresponding to an unauthorized motion relating to operating machinery 1402.

In still another example, computer 1406, in being configured to change the alert, is configured to perform one of: change a pitch of an audible alert, change a volume of an audible alert, change a color of a visible alert, change an intensity of a visible alert, and combinations thereof.

In yet another illustrative embodiment, computer 1406 is further configured to: prior to determining that the false positive has not occurred, use the motion sensor to track movement of a plurality of points of articulation of the skeletal positions of the one or more humans to create tracked points of articulation. In this case, computer 1406 compares the tracked points of articulation to known sets of points of articulation. Computer 1406 then, responsive to the tracked points of articulation matching an authorized set of points of articulation corresponding to an authorized movement of the human with respect to machinery 1402, determine that the false positive result has occurred.

In still another illustrative embodiment, computer 1406 is further configured to: detect an object using the motion sensor, wherein in being configured to determine whether the false positive result has occurred, computer 1406 is further configured to determine whether the object is static. If the object is static, then computer 1406 is further configured to determine that the false positive has occurred.

In yet another illustrative embodiment, computer 1406 is further configured to: detect an object using the motion sensor. In being configured to determine whether the false positive result has occurred, computer 1406 is further configured to determine whether the object is beyond a predetermined distance from machinery 1402. If the object beyond the predetermined distance, then computer 1406 is further configured to determine that the false positive has occurred.

In still a different illustrative embodiment, computer 1406 is further configured to: detect an object using the motion sensor. In being configured to determine whether the false positive result has occurred, computer 1406 is further configured to determine whether the object is engaging in an authorized movement. If the object is engaging in the authorized movement then computer 1406 is further configured to determine that the false positive has occurred.

Figure 15:
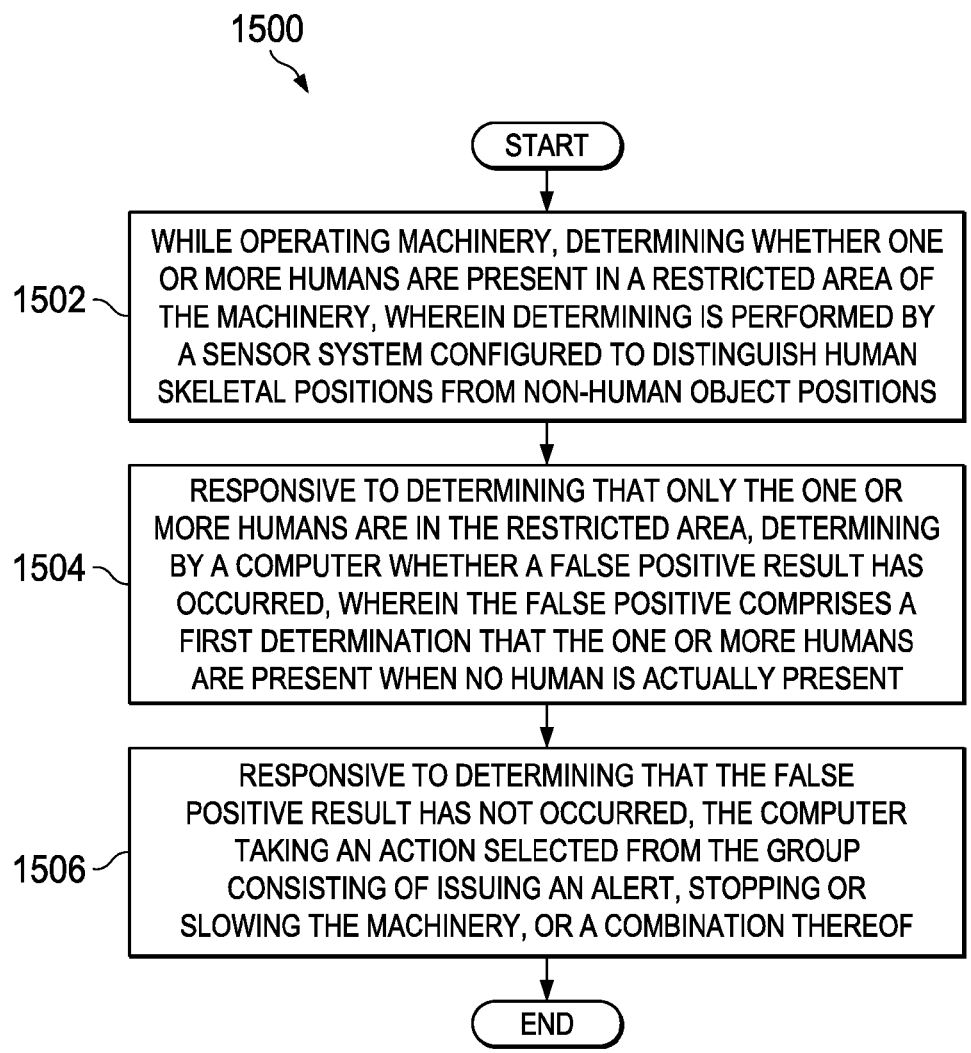
FIG. 15 is a flowchart for operating machinery, in accordance with an illustrative embodiment.

FIG. 15 is a flowchart for operating machinery, in accordance with an illustrative embodiment. Method 1500 may be implemented using a system, such as system 1400 of FIG. 14 or system 1300 of FIG. 13. Method 1500 may be performed in a manufacturing environment, such as manufacturing environment 100 of FIG. 1 or manufacturing environment 200 of FIG. 2. Method 1500 may be performed using the methods and devices described with respect to FIG. 3 through FIG. 13.

Method 1500 includes, while operating machinery, determining whether one or more humans are present in a restricted area of the machinery, wherein determining is performed by a sensor system configured to distinguish human skeletal positions from non-human object positions (operation 1502). Method 1500 also includes, responsive to determining that only the one or more humans are in the restricted area, determining by a computer whether a false positive result has occurred, wherein the false positive comprises a first determination that the one or more humans are present when no human is actually present (operation 1504). Method 1500 also includes, responsive to determining that the false positive result has not occurred, the computer taking an action selected from the group consisting of issuing an alert, stopping or slowing the machinery, or a combination thereof (operation 1506). The method may terminate thereafter.

Method 1500 may be varied. For example, the operation of determining whether one or more humans are present within a restricted area may further include: tracking a plurality of points of articulation of the skeletal positions of the one or more humans to create tracked points of articulation, comparing the tracked points of articulation to known sets of points of articulation, and responsive to the tracked points of articulation matching at least one of the known sets of points of articulation, determining that only the one or more humans are present in the restricted area.

Method 1500 may also include changing the alert responsive to a second determination that the tracked points of articulation correspond to a forbidden skeletal position of the one or more humans. In this case, the forbidden skeletal position may be selected from the group consisting of: a first position corresponding to speaking on a mobile communicator, a second set of positions corresponding to running, a third set of positions corresponding to moving in a particular direction relative to the machinery, and a fourth set of positions corresponding to an unauthorized motion relating to operating the machinery. However, other skeletal positions are possible. In another example, changing the alert may be selected from the group consisting of: changing a pitch of an audible alert, changing a volume of an audible alert, changing a color of a visible alert, changing an intensity of a visible alert, and combinations thereof.

In a different illustrative embodiment, method 1500 may further include, prior to determining that the false positive has not occurred, using the computer and the motion sensor to track movement of a plurality of points of articulation of the skeletal positions of the one or more humans to create tracked points of articulation. In this case, method 1500 also includes comparing, by the computer, the tracked points of articulation to known sets of points of articulation. Further, in this example, method 1500 also includes: responsive to the tracked points of articulation matching an authorized set of points of articulation corresponding to an authorized movement of the human with respect to the machinery, the computer determining that the false positive result has occurred.

In a still different illustrative embodiment, method 1500 may further include detecting an object using the motion sensor. In this case, determining by the computer whether the false positive result has occurred comprises determining whether the object is static. If the object is static, then the computer determines that the false positive has occurred.

In yet another illustrative embodiment, method 1500 may also include detecting an object using the motion sensor. In this case, determining by the computer whether the false positive result has occurred comprises determining whether the object is beyond a predetermined distance from the machinery. If the object beyond the predetermined distance, then the computer determines that the false positive has occurred.

In still another illustrative embodiment, method 1500 may also include detecting an object using the motion sensor. In this case, determining by the computer whether the false positive result has occurred comprises determining whether the object is engaging in an authorized movement. If the object is engaging in the authorized movement then the computer determines that the false positive has occurred.

In yet another illustrative embodiment, method 1500 may further include tracking a plurality of points of articulation of the skeletal positions of the one or more humans to create tracked points of articulation. In this case method 1500 may also include comparing the tracked points of articulation to known sets of points of articulation. The known sets of points of articulation corresponding to authorized movements or authorized positions of the human. Also for this case, method 1500 may further include: responsive to the tracked points of articulation matching at least one of the known sets of points of articulation, determining that the false positive has occurred.

From the above, many variations are possible. Additional variations are also possible. More or fewer operations may be present in some advantageous embodiments, and different operations may be present as described with respect to FIG. 1 through FIG. 13. Thus, the advantageous embodiments described with respect to FIG. 15 do not necessarily limit the claimed inventions.

Figure 16:
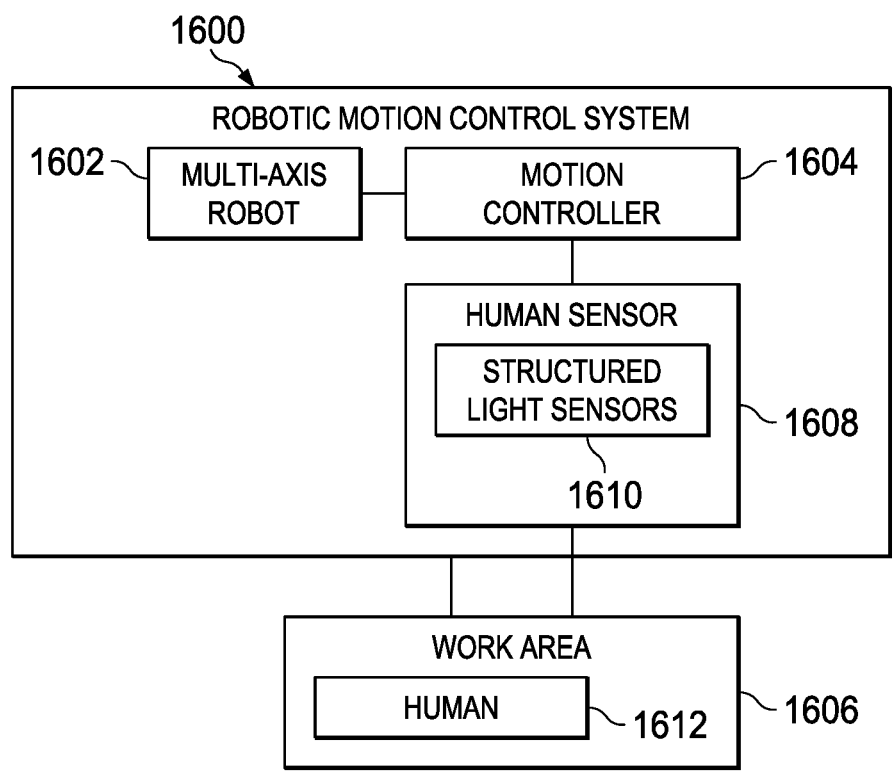
FIG. 16 is a block diagram of a robotic motion control system, in accordance with an illustrative embodiment.

FIG. 16 is a block diagram of a robotic motion control system, in accordance with an illustrative embodiment. Robotic motion control system 1600 may include multi-axis robot 1602. A "multi-axis robot" is defined as robotic machinery which, when viewed as a whole device, is capable of moving and articulating in three dimensions. Robotic motion control system 1600 is in communication with motion controller 1604 that receives motion control instructions controlling motion of multi-axis robot 1602 in work area 1606.

Robotic motion control system 1600 also includes human sensor 1608 in communication with motion controller 1604. Human sensor 1608 is calibrated to scan work area 1606 using structured light sensors 1610 to identify human 1612 and motion thereof within work area 1606. An example of a structured light sensor is a camera with software for interpreting images. Another example is a light sensor configured to receive light input from a device attached to a person or moving object. Other examples are possible.

Human sensor 1608 detects if an identified human, such as human 1612, moves within a first distance of multi-axis robot 1602 and communicates a warning, and communicates a stop-motion instruction to motion controller 1604 if the identified human moves within a second distance of multi-axis robot 1602 that is less than the first distance.

More or fewer devices may be present in robotic motion control system 1600 in some advantageous embodiments. Thus, the advantageous embodiments described with respect to FIG. 16 do not necessarily limit the claimed inventions.

Figure 17:
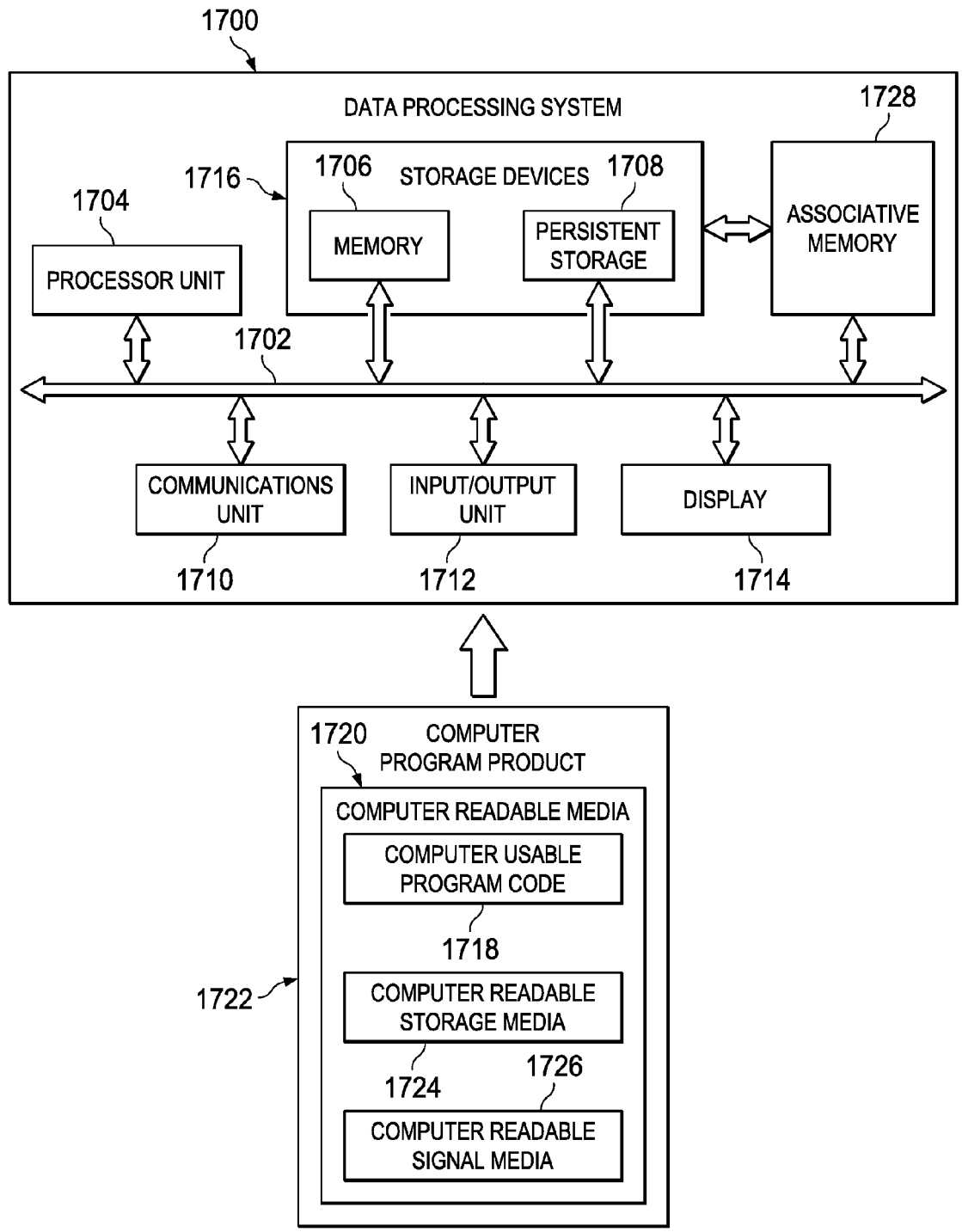
FIG. 17 is an illustration of a data processing system, in accordance with an illustrative embodiment.

Turning now to FIG. 17, an illustration of a data processing system is depicted in accordance with an illustrative embodiment. Data processing system 1700 in FIG. 16 is an example of a data processing system that may be used to implement the illustrative embodiments, those described with respect to FIG. 1 through FIG. 15, or any other module or system or process disclosed herein. In this illustrative example, data processing system 1700 includes communications fabric 1702, which provides communications between processor unit 1704, memory 1706, persistent storage 1708, communications unit 1710, input/output (I/O) unit 1712, and display 1714.

Processor unit 1704 serves to execute instructions for software that may be loaded into memory 1706. This software may be any of the associative memories described elsewhere herein, or software for implementing the processes described elsewhere herein. Thus, for example, software loaded into memory 1706 may be software for executing method 500 of FIG. 5 or method 1500 of FIG. 15. Processor unit 1704 may be a number of processors, a multi-processor core, or some other type of processor, depending on the particular implementation. A number, as used herein with reference to an item, means one or more items. Further, processor unit 1704 may be implemented using a number of heterogeneous processor systems in which a main processor is present with secondary processors on a single chip. As another illustrative example, processor unit 1704 may be a symmetric multi-processor system containing multiple processors of the same type.

Memory 1706 and persistent storage 1708 are examples of storage devices 1716. A storage device is any piece of hardware that is capable of storing information, such as, for example, without limitation, data, program code in functional form, and/or other suitable information either on a temporary basis and/or a permanent basis. Storage devices 1716 may also be referred to as computer readable storage devices in these examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these examples, provides for communications with other data processing systems or devices. In these examples, communications unit 1710 is a network interface card. Communications unit 1710 may provide communications through the use of either or both physical and wireless communications links.

Input/output (I/O) unit 1712 allows for input and output of data with other devices that may be connected to data processing system 1700. For example, input/output (I/O) unit 1712 may provide a connection for user input through a keyboard, a mouse, and/or some other suitable input device. Further, input/output (I/O) unit 1712 may send output to a printer. Display 1714 provides a mechanism to display information to a user.

Instructions for the operating system, applications, and/or programs may be located in storage devices 1716, which are in communication with processor unit 1704 through communications fabric 1702. In these illustrative examples, the instructions are in a functional form on persistent storage 1708. These instructions may be loaded into memory 1706 for execution by processor unit 1704. The processes of the different embodiments may be performed by processor unit 1704 using computer implemented instructions, which may be located in a memory, such as memory 1706.

These instructions are referred to as program code, computer usable program code, or computer readable program code that may be read and executed by a processor in processor unit 1704. The program code in the different embodiments may be embodied on different physical or computer readable storage media, such as memory 1706 or persistent storage 1708.

Program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these examples. In one example, computer readable media 1720 may be computer readable storage media 1724 or computer readable signal media 1726. Computer readable storage media 1724 may include, for example, an optical or magnetic disk that is inserted or placed into a drive or other device that is part of persistent storage 1708 for transfer onto a storage device, such as a hard drive, that is part of persistent storage 1708. Computer readable storage media 1724 also may take the form of a persistent storage, such as a hard drive, a thumb drive, or a flash memory, that is connected to data processing system 1700. In some instances, computer readable storage media 1724 may not be removable from data processing system 1700.

Alternatively, program code 1718 may be transferred to data processing system 1700 using computer readable signal media 1726. Computer readable signal media 1726 may be, for example, a propagated data signal containing program code 1718. For example, computer readable signal media 1726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1718 may be downloaded over a network to persistent storage 1708 from another device or data processing system through computer readable signal media 1726 for use within data processing system 1700. For instance, program code stored in a computer readable storage medium in a server data processing system may be downloaded over a network from the server to data processing system 1700. The data processing system providing program code 1718 may be a server computer, a client computer, or some other device capable of storing and transmitting program code 1718.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1704 may take the form of a hardware unit that has circuits that are manufactured or configured for a particular use. This type of hardware may perform operations without needing program code to be loaded into a memory from a storage device to be configured to perform the operations.

For example, when processor unit 1704 takes the form of a hardware unit, processor unit 1704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, computer useable program code 1718 may be omitted because the processes for the different embodiments are implemented in a hardware unit.

In still another illustrative example, processor unit 1704 may be implemented using a combination of processors found in computers and hardware units. Processor unit 1704 may have a number of hardware units and a number of processors that are configured to run computer useable program code 1718. With this depicted example, some of the processes may be implemented in the number of hardware units, while other processes may be implemented in the number of processors.

As another example, a storage device in data processing system 1700 is any hardware apparatus that may store data. Memory 1706, persistent storage 1708, and computer readable media 1720 are examples of storage devices in a tangible form.

In another example, a bus system may be used to implement communications fabric 1702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1706, or a cache, such as found in an interface and memory controller hub that may be present in communications fabric 1702.

Data processing system 1700 may also include associative memory 1728. Associative memory 1728 may be in communication with communications fabric 1702. Associative memory 1728 may also be in communication with, or in some illustrative embodiments, be considered part of storage devices 1716. While one associative memory 1728 is shown, additional associative memories may be present.

As used herein, the term "associative memory" refers to a content addressable memory. An associative memory may be considered a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on at least indirect relationships, as well as based on combinations of direct and at least indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and at least indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for operating machinery in a manufacturing environment including machinery, the system comprising:
    a sensor system configured to distinguish human skeletal positions from non-human object positions, wherein the sensor system is further configured to ignore selected points of articulation from the human skeletal positions such that only one or more appendages of the human are processed, and wherein the sensor system is further configured to determine whether one or more humans are present in a predetermined area based only on sensed positions of the one or more appendages; and
    a computer configured to:
    responsive to determining that only the one or more humans are in the predetermined area, determine whether a false positive result has occurred, wherein the false positive comprises a first determination that the one or more humans are present when no human is actually present; and
    responsive to determining that the false positive result has not occurred, the computer take an action selected from the group consisting of issuing an alert, stopping the machinery, or a combination thereof.

2. The system of claim 1, wherein the computer, in being configured to determine whether one or more humans are present in the predetermined area, the computer is further configured to:
    use the sensor system to track a plurality of points of articulation of the skeletal positions of the one or more humans to create tracked points of articulation;
    compare the tracked points of articulation to known sets of points of articulation; and
    responsive to the tracked points of articulation matching at least one of the known sets of points of articulation, determine that only the one or more humans are present in the predetermined area.

3. The system of claim 2, wherein the computer is further configured to:
    change the alert responsive to a second determination by the computer that the tracked points of articulation correspond to a forbidden skeletal position of the one or more humans.

4. The system of claim 3, wherein the forbidden skeletal position is selected from the group consisting of:
    a first position corresponding to speaking on a mobile communicator,
    a second set of positions corresponding to running and
    a third set of positions corresponding to moving in a particular direction relative to the machinery.

5. The system of claim 4, wherein the computer, in being configured to change the alert, is configured to perform one of: change a pitch of an audible alert, change a volume of an audible alert, change a color of a visible alert, change an intensity of a visible alert, and combinations thereof.

6. The system of claim 1, wherein the computer is further configured to:
    prior to determining that the false positive has not occurred, use the sensor system to track movement of a plurality of points of articulation of the skeletal positions of the one or more humans to create tracked points of articulation;
    compare the tracked points of articulation to known sets of points of articulation; and responsive to the tracked points of articulation matching an authorized set of points of articulation corresponding to an authorized movement of the human with respect to the machinery, determine that the false positive result has occurred.

7. The system of claim 1, wherein the computer is further configured to:
detect an object using the sensor system, wherein in being configured to determine whether the false positive result has occurred, the computer is further configured to determine whether the object is static, and wherein if the object is static then the computer is further configured to determine that the false positive has occurred.

8. The system of claim 1, wherein the computer is further configured to:
detect an object using the sensor system, wherein in being configured to determine whether the false positive result has occurred, the computer is further configured to determine whether the object is beyond a predetermined distance from the machinery, and wherein if the object beyond the predetermined distance, then the computer is further configured to determine that the false positive has occurred.

9. The system of claim 1, wherein the computer is further configured to:
detect an object using the sensor system, wherein in being configured to determine whether the false positive result has occurred, the computer is further configured to determine whether the object is engaging in an authorized movement, and wherein if the object is engaging in the authorized movement then the computer is further configured to determine that the false positive has occurred.

10. A method of operating machinery, the method comprising:
while operating machinery, determining whether one or more humans are present in a predetermined area of the machinery, wherein determining is performed by a sensor system configured to distinguish human skeletal positions from non-human object positions, wherein determining further comprises ignoring selected points of articulation from the human skeletal positions such that only one or more appendages of the human are sensed, and wherein determining is further based only on sensed positions of the one or more appendages;
responsive to determining that only the one or more humans are in the predetermined area, determining by a computer whether a false positive result has occurred, wherein the false positive comprises a first determination that the one or more humans are present when no human is actually present; and
responsive to determining that the false positive result has not occurred, the computer taking an action selected from the group consisting of issuing an alert, stopping the machinery, or a combination thereof.

11. The method of claim 10, wherein determining whether one or more humans are present the predetermined area comprises:
tracking a plurality of points of articulation of the skeletal positions of the one or more humans to create tracked points of articulation, comparing the tracked points of articulation to known sets of points of articulation, and responsive to the tracked points of articulation matching at least one of the known sets of points of articulation, determining that only the one or more humans are present in the predetermined area.

12. The method of claim 11 further comprising:
changing the alert responsive to a second determination that the tracked points of articulation correspond to a forbidden skeletal position of the one or more humans.

13. The method of claim 12, wherein the forbidden skeletal position is selected from the group consisting of: a first position corresponding to speaking on a mobile communicator, a second set of positions corresponding to running, a third set of positions corresponding to moving in a particular direction relative to the machinery, and a fourth set of positions corresponding to an unauthorized motion relating to operating the machinery.

14. The method of claim 13, wherein changing the alert is selected from the group consisting of:
changing a pitch of an audible alert, changing a volume of an audible alert, changing a color of a visible alert, changing an intensity of a visible alert, and combinations thereof.

15. The method of claim 10 further comprising:
prior to determining that the false positive has not occurred, using the computer and the sensor system to track movement of a plurality of points of articulation of the skeletal positions of the one or more humans to create tracked points of articulation;
comparing, by the computer, the tracked points of articulation to known sets of points of articulation; and
responsive to the tracked points of articulation matching an authorized set of points of articulation corresponding to an authorized movement of the human with respect to the machinery, the computer determining that the false positive result has occurred.

16. The method of claim 10 further comprising:
detecting an object using the sensor system, wherein determining by the computer whether the false positive result has occurred comprises determining whether the object is static, and wherein if the object is static then the computer determines that the false positive has occurred.

17. The method of claim 10 further comprising:
detecting an object using the sensor system, wherein determining by the computer whether the false positive result has occurred comprises determining whether the object is beyond a predetermined distance from the machinery, and wherein if the object beyond the predetermined distance then the computer determines that the false positive has occurred.

18. The method of claim 10 further comprising:
detecting an object using the sensor system, wherein determining by the computer whether the false positive result has occurred comprises determining whether the object is engaging in an authorized movement, and wherein if the object is engaging in the authorized movement then the computer determines that the false positive has occurred.

19. The method of claim 10 further comprising:
tracking a plurality of points of articulation of the skeletal positions of the one or more humans to create tracked points of articulation;
comparing the tracked points of articulation to known sets of points of articulation, the known sets of points of articulation corresponding to authorized movements or authorized positions of the human; and
responsive to the tracked points of articulation matching at least one of the known sets of points of articulation, determining that the false positive has occurred.

20. A robotic motion control system, comprising:
- a multi-axis robot in communication with a motion controller that receives motion control instructions controlling motion of the multi-axis robot in a work area;
- a human sensor in communication with the motion controller, and calibrated to scan the work area using structured light sensors to identify human presence and motion thereof within the work area, and to determine whether or not the human presence is a false positive and that there is actually no human present, wherein the human sensor is further configured to ignore selected points of articulation from human skeletal positions such that only one or more appendages of the human are sensed, and wherein the human sensor is further configured to determine whether or not the human presence is a false positive based only on sensed positions of the one or more appendages; and
- the human sensor configured to detect if an identified human moves within a first distance of the multi-axis robot and communicate a warning, and communicate a stop-motion instruction to the motion controller if the identified human moves within a second distance of the multi-axis robot that is less than the first distance.

21. The robotic motion control system of claim 20, wherein the human sensor, in being configured to detect, is further configured to:
- track a plurality of points of articulation of the skeletal positions of the human to create tracked points of articulation;
- compare the tracked points of articulation to known sets of points of articulation; and
- responsive to the tracked points of articulation matching at least one of the known sets of points of articulation, determine that only the identified human is present in the work area.

22. The robotic motion control system of claim 21, wherein the human sensor is further configured to:
- change the communication to the human responsive to a second determination that the tracked points of articulation correspond to a forbidden skeletal position of the human.

23. The robotic motion control system of claim 22, wherein the forbidden skeletal position is selected from the group consisting of: a first position corresponding to speaking on a mobile communicator, a second set of positions corresponding to running, a third set of positions corresponding to moving in a particular direction relative to the machinery, and a fourth set of positions corresponding to an unauthorized motion relating to operating the multi-axis robot.

24. The robotic motion control system of claim 23, wherein the human sensor, in being configured to change the warning, is configured to perform one of: change a pitch of an audible alert, change a volume of an audible alert, change a color of a visible alert, change an intensity of a visible alert, and combinations thereof.

25. A method of operating machinery comprising:
- determining whether there is at least one object in a predetermined area while the machinery is in operation, the predetermined area being an area in proximity to the machinery;
- responsive to determining that there is at least one object in the predetermined area, determining whether the at least one object is a human based on only selected points of articulation from a human skeleton that correspond only to appendages of the human, and while ignoring other points of articulation from the human skeleton;
- in response to determining that the at least one object is a human, determining whether movements of the human are undesirable, wherein undesirable movements are learned by observing previous movements of humans in the predetermined area; and
- responsive to determining that the movements are undesirable, triggering an alarm.

26. The method of claim 25, wherein in triggering the alarm a determination is made as to whether the undesirable movements are justified, wherein in response to determining that the undesirable movements are justified the alarm is not triggered.

27. The method of claim 26, wherein the alarm is triggered to avoid possible harm to the human.

28. The method of claim 26, wherein the alarm is triggered to avoid damage to the machinery.

29. The method of claim 26, wherein in response to determining that the at least one object is not a human, determining whether the at least one object is a robot, wherein the alarm is triggered in response to determining that the at least one object is a robot and the undesirable movements are from the robot.

* * * * *